United States Patent
Shellhammer et al.

(10) Patent No.: US 11,894,964 B2
(45) Date of Patent: *Feb. 6, 2024

(54) SECURE LONG TRAINING FIELD (LTF)

(71) Applicant: QUALCOMM Incorporated, San Diego, CA (US)

(72) Inventors: Stephen Jay Shellhammer, Ramona, CA (US); Bin Tian, San Diego, CA (US); Alireza Raissinia, Monte Sereno, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,523

(22) Filed: Dec. 13, 2022

(65) Prior Publication Data
US 2023/0113177 A1  Apr. 13, 2023

Related U.S. Application Data

(63) Continuation of application No. 17/244,500, filed on Apr. 29, 2021, now Pat. No. 11,546,196.
(Continued)

(51) Int. Cl.
*H04L 27/26* (2006.01)
*H04L 5/00* (2006.01)
*H04B 7/0452* (2017.01)

(52) U.S. Cl.
CPC ........ *H04L 27/2613* (2013.01); *H04L 5/0023* (2013.01); *H04L 5/0048* (2013.01); *H04L 27/2605* (2013.01); *H04B 7/0452* (2013.01)

(58) Field of Classification Search
CPC ... H04B 7/0452; H04L 5/0023; H04L 5/0048; H04L 27/2605; H04L 27/2613; H04W 12/037; H04W 84/12
See application file for complete search history.

(56) References Cited

U.S. PATENT DOCUMENTS

| 6,563,881 B1 | 5/2003 | Sakoda et al. |
| 9,425,954 B1 | 8/2016 | Chalker |
(Continued)

FOREIGN PATENT DOCUMENTS

WO    WO2019156874 A1    8/2019

OTHER PUBLICATIONS 802 11 Working Group of LAN/WAN Standard Committee of the IEEE: IEEE Draft, Draft P802.11AZ_D2.1 With Corrections, IEEE-SA, Piscataway, NJ, USA, vol. 802.11az Drafts, No. D2.1, Mar. 19, 2020 (Mar. 19, 2020), pp. 1-237, XP068166239, Retrieved from the Internet: URL: http://www.ieee802.org/11/private/Draft_Standards/11az/Draft%20P802.11az_D2.1%20with%20corrections.pdf [retrieved on Mar. 19, 2020] section 27.3, pp. 191-203.
(Continued)

*Primary Examiner* — David B Lugo
(74) *Attorney, Agent, or Firm* — Holland & Hart LLP

(57) ABSTRACT

This disclosure provides methods, devices and systems for generating a secure long training field (LTF). In some implementations, the secure LTF may include a randomized bit sequence that is difficult, if not impossible, to replicate by any device other than the transmitting device and the intended receiving device. For example, the transmitting device may use a block cipher or stream cipher to generate a pseudorandom bit sequence and may select a subset of bits of the pseudorandom bit sequence to be mapped to a sequence of modulation symbols representing an LTF symbol of the secure LTF. More specifically, each of the modulation symbols is mapped to a respective one of a number of subcarriers spanning a bandwidth of the secure LTF. The transmitting device may further transmit a physical layer convergence protocol (PLCP) protocol data unit (PPDU) that includes the secure LTF to the receiving device.

34 Claims, 21 Drawing Sheets

Related U.S. Application Data

(60) Provisional application No. 63/076,181, filed on Sep. 9, 2020, provisional application No. 63/019,081, filed on May 1, 2020, provisional application No. 63/019,101, filed on May 1, 2020.

(56) References Cited

U.S. PATENT DOCUMENTS

| | | |
|---|---|---|
| 11,546,196 B2 * | 1/2023 | Shellhammer ........ H04L 5/0023 |
| 2008/0273522 A1 | 11/2008 | Luo et al. |
| 2016/0255620 A1 | 9/2016 | Li et al. |
| 2016/0286551 A1 | 9/2016 | Lee et al. |
| 2019/0082390 A1 | 3/2019 | Azizi et al. |
| 2019/0182365 A1 | 6/2019 | Li et al. |
| 2019/0182674 A1 | 6/2019 | Li et al. |
| 2020/0304359 A1 | 9/2020 | Li et al. |
| 2021/0306189 A1 | 9/2021 | Lopez |
| 2021/0344541 A1 | 11/2021 | Shellhammer |

OTHER PUBLICATIONS

International Search Report and Written Opinion—PCT/US2021/030105—ISA/EPO—dated Jul. 23, 2021.
Segev (Intel Corporation) J., "TGaz Next Generation Positioning Intra to 11az Feature Set", IEEE Draft, 11-19-2155-00-00AZ-INTRO-TO-11AZ-FEATURE-SET, IEEE-SA Mentor, Piscataway, NJ, USA, vol. 802.11az, Dec. 15, 2019 (Dec. 15, 2019), pp. 1-22, XP068165519, 20201212, Retrieved from the Internet: URL: https://mentor.ieee.org/802.11/dcn/19/11-19-2155-00-00az-intro-to-11az-feature-set.pptx [retrieved on Dec. 15, 2019] Slides 15-18.

* cited by examiner

SECURE LONG TRAINING FIELD (LTF)

CROSS-REFERENCE TO RELATED APPLICATIONS

This patent application is a Continuation of U.S. patent application Ser. No. 17/244,500 entitled, "SECURE LONG TRAINING FIELD (LTF)" filed Apr. 29, 2021, which claims priority to U.S. Provisional Patent Application No. 63/019,081 entitled "SECURE LONG TRAINING FIELD (LTF)" filed on May 1, 2020, and to U.S. Provisional Patent Application No. 63/019,101 entitled "SECURE LONG TRAINING FIELD (LTF)" filed on May 1, 2020, to U.S. Provisional Patent Application No. 63/076,181 entitled "SECURE LONG TRAINING FIELD (LTF)" and filed on Sep. 9, 2020, each of which are assigned to the assignee hereof, and each of which are expressly incorporated by reference herein.

TECHNICAL FIELD

This disclosure relates generally to wireless communication, and more specifically, to secure long training fields (LTFs) for wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

The IEEE 802.11 family of standards define a packet format, to be used for wireless communication, which includes one or more long training fields (LTFs). LTFs are generally used for channel estimation purposes. For example, a transmitting device may transmit a known pattern of symbols, in an LTF, to a receiving device. The receiving device may use its knowledge of the symbol pattern in the received LTF to estimate how wireless communications propagate through a wireless channel between the transmitting device and the receiving device. Unlike data fields, LTFs do not carry any useful information or user-specific data. Thus, in accordance with existing versions of the IEEE 802.11 standard, LTF symbols are transmitted with very little or no security. However, recent amendments to the IEEE 802.11 standard (such as 802.11az) have expanded the uses for LTFs in ways which may be subject to attack. It is therefore desirable to provide greater security for LTFs used in some wireless communications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include generating a pseudorandom bit sequence; selecting a first subset of bits of the pseudorandom bit sequence based on a number (N) of subcarriers associated with a long training field (LTF) of a physical (PHY) layer convergence protocol (PLCP) protocol data unit (PPDU), where a number of bits in the first subset of bits is greater than N; mapping values of the first subset of bits to a sequence of first modulation symbols representing a first LTF symbol of the LTF, where each of the first modulation symbols is modulated on a respective one of the N subcarriers; and transmitting the PPDU, including the LTF, to a receiving device.

In some implementations, the pseudorandom bit sequence may be generated in a PHY layer of the wireless communication device. In some implementations, the pseudorandom bit sequence may be generated based on an output of an advanced encryption standard (AES) block cipher. In some aspects, the generating of the pseudorandom bit sequence may include generating a set of secure bits in a media access control (MAC) layer of the wireless communication device and initializing the block cipher in the PHY layer of the wireless communication device based on the set of secure bits from the MAC layer.

In some implementations, the mapping of the values of the first subset of bits to the sequence of first modulation symbols may be performed in accordance with a quadrature amplitude modulation (QAM) scheme. In some aspects, each of the first modulation symbols may be a 64-QAM symbol. In some implementations, the first subset of bits may be selected from a portion of the pseudorandom bit sequence that does not include any repetitions.

In some implementations, the method may further include mapping the sequence of first modulation symbols to a number (M) of spatial streams and applying M sets of first phase rotations to the sequence of first modulation symbols mapped to the M spatial streams, respectively, where each set of the M sets of first phase rotations is different than the remaining M−1 sets of first phase rotations. In some aspects, the method may further include generating the M sets of first phase rotations based on a pseudorandom output of a linear feedback shift register (LFSR).

In some implementations, the method may further include selecting a second subset of bits of the pseudorandom bit sequence, where the second subset of bits is different than the first subset of bits; mapping values of the second subset of bits to a sequence of second modulation symbols representing a second LTF symbol of the LTF, where each of the second modulation symbols is modulated on a respective one of the N subcarriers; mapping the sequence of second modulation symbols to the M spatial streams; and applying the M sets of first phase rotations to the sequence of second modulation symbols mapped to the M spatial streams, respectively. In some aspects, the second subset of bits may be selected from a portion of the pseudorandom bit sequence that does not include any repetitions or bits from the first subset.

In some implementations, the method may further include mapping the values of the first subset of bits to a sequence of second modulation symbols representing a second LTF symbol of the LTF, where each of the second modulation symbols is modulated on a respective one of the N subcarriers; mapping the sequence of second modulation symbols to the M spatial streams; and applying M sets of second phase rotations to the sequence of second modulation symbols mapped to the M spatial streams, respectively, where each set of the M sets of second phase rotations is different than the remaining M−1 sets of second phase rotations and different than the M sets of first phase rotations.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a pseudorandom bit sequence; selecting a first subset of bits of the pseudorandom bit sequence based on a number (N) of subcarriers associated with an LTF of a PPDU, where a number of bits in the first subset of bits is greater than N; mapping values of the first subset of bits to a sequence of first modulation symbols representing a first LTF symbol of the LTF, where each of the first modulation symbols is modulated on a respective one of the N subcarriers; and transmitting the PPDU, including the LTF, to a receiving device.

Another innovative aspect of the subject matter described in this disclosure can be implemented as a method of wireless communication. The method may be performed by a wireless communication device, and may include generating a pseudorandom bit sequence; receiving a PPDU, over a wireless channel, from a transmitting device; recovering a sequence of first modulation symbols from an LTF of the received PPDU, where the sequence of first modulation symbols represents a first LTF symbol of the LTF; demodulating each of the first modulation symbols from a respective one of a number (N) of subcarriers associated with the LTF, where the demodulation of the first modulation symbols produces a first subset of bits representing the first LTF symbol; and estimating the wireless channel based on the first subset of bits and the pseudorandom bit sequence.

In some implementations, the pseudorandom bit sequence may be generated in a PHY layer of the wireless communication device. In some implementations, the pseudorandom bit sequence may be generated based on an output of an AES block cipher. In some aspects, the generating of the pseudorandom bit sequence may include generating a set of secure bits in a MAC layer of the wireless communication device and initializing the AES block cipher block in the PHY layer of the wireless communication device based on the set of secure bits from the MAC layer.

In some implementations, each of the first modulation symbols may be demodulated in accordance with a QAM scheme. In some aspects, each of the first modulation symbols may be a 64-QAM symbol.

In some implementations, the PPDU may be received on a number (M) of spatial streams and the recovering of the sequence of first modulation symbols may include applying M sets of first phase rotations to the M spatial streams, respectively, where each set of the M sets of first phase rotations is different than the remaining M−1 sets of first phase rotations. In some aspects, the method may further include generating the M sets of first phase rotations based on a pseudorandom output of an LFSR.

In some implementations, the method may further include recovering a sequence of second modulation symbols from the LTF of the received PPDU, where the sequence of second modulation symbols represents a second LTF symbol of the LTF; and demodulating each of the second modulation symbols from a respective one of the N subcarriers, where the demodulation of the second modulation symbols produces a second subset of bits representing the second LTF symbol, and where the wireless channel estimate is based on the first subset of bits, the second subset of bits, and the pseudorandom bit sequence.

In some implementations, the recovering of the sequence of second modulation symbols may include applying the M sets of first phase rotations to the M spatial streams, respectively. In some other implementations, the recovering of the sequence of second modulation symbols may include applying the M sets of second phase rotations to the M spatial streams, respectively, where each of the M sets of second phase rotations is different than the remaining M−1 sets of second phase rotations and different than the M sets of first phase rotations.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a pseudorandom bit sequence; receiving a PPDU, over a wireless channel, from a transmitting device; recovering a sequence of first modulation symbols from an LTF of the received PPDU, where the sequence of first modulation symbols represents a first LTF symbol of the LTF; demodulating each of the first modulation symbols from a respective one of a number (N) of subcarriers associated with the LTF, where the demodulation of the first modulation symbols produces a first subset of bits representing the first LTF symbol; and estimating the wireless channel based on the first subset of bits and the pseudorandom bit sequence

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
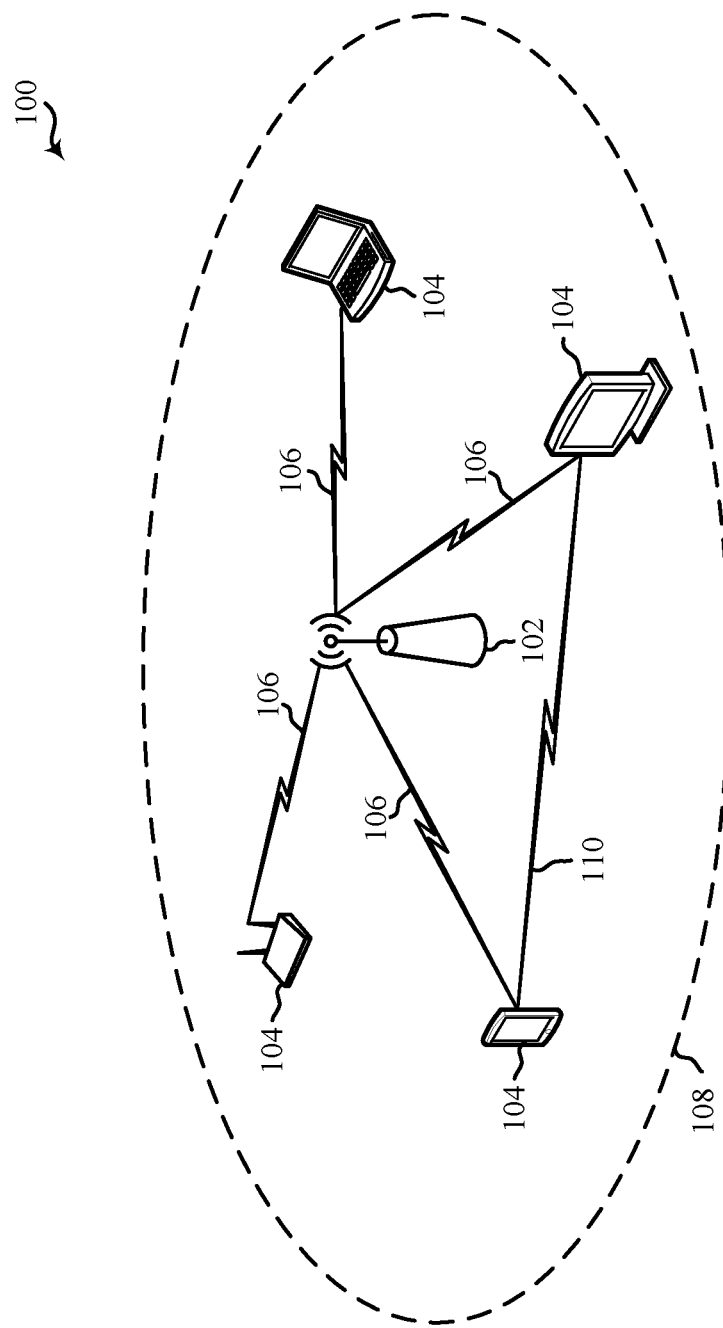
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to long training fields (LTFs) used in wireless communications, and more particularly, to generating a secure LTF that is difficult to decode or replicate by observing only a portion of the LTF. In some aspects, the secure LTF may include a randomized bit sequence that is difficult, if not impossible, to replicate by any device other than the transmitting device and the intended receiving device (using a secure key previously shared over a secure wireless link). For example, the transmitting device may use a block or a stream cipher to generate a pseudorandom bit sequence and may select a subset of bits of the pseudorandom bit sequence to be mapped to a sequence of modulation symbols (also referred to herein as an "LTF sequence") representing an LTF symbol of the secure LTF. More specifically, each of the modulation symbols is mapped to a respective one of a number of subcarriers spanning a bandwidth of the secure LTF. The transmitting device may further transmit a physical layer convergence protocol (PLCP) protocol data unit (PPDU) that includes the secure LTF to the receiving device.

Particular implementations of the subject matter described in this disclosure can be implemented to realize one or more of the following potential advantages. In some implementations, the described techniques can be used to improve the security of LTFs used in wireless communications. For example, LTF sequences conforming to existing versions of the IEEE 802.11 standard are encoded or modulated based on deterministic functions. As a result, an attacker (or unintended receiving device) may receive a portion of an LTF sequence and determine or predict the remainder of the LTF sequence based on the received portion. A sophisticated attacker may even copy or spoof the LTF sequence before the transmitting device has finished transmitting the original LTF sequence to the receiving device. For example, the attacker may transmit the spoofed LTF sequence to the receiving device to cause errors in channel or timing measurements by the receiving device. By randomizing the modulation symbols associated with individual LTF sequences, aspects of the present disclosure may prevent or substantially delay such attacks on LTF sequences long enough to render the attacks ineffective.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
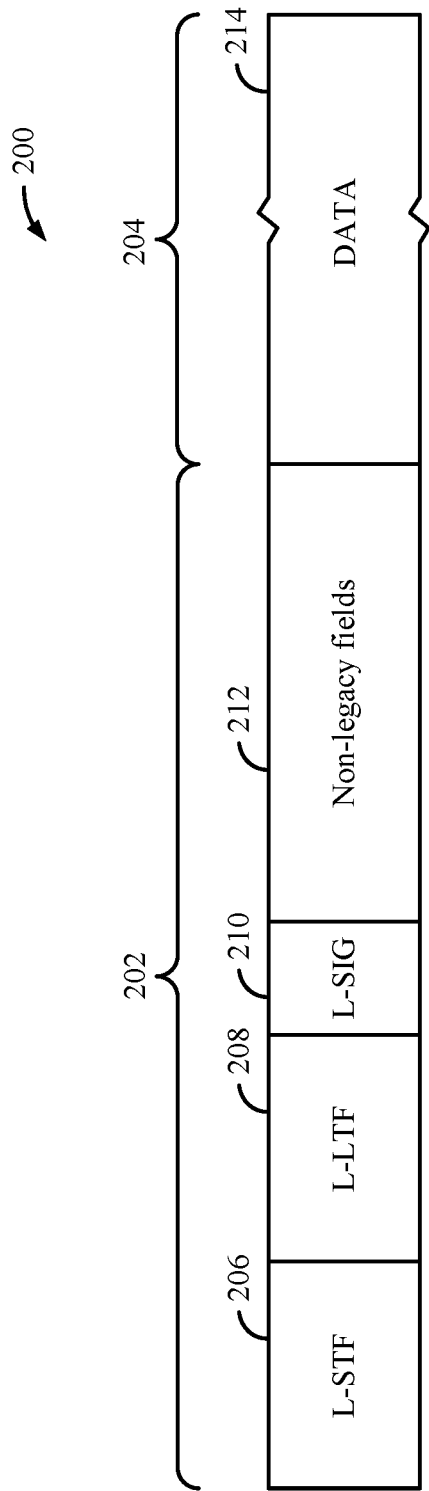
FIG. 2A shows an example protocol data unit (PDU) usable for communications between an access point (AP) and one or more stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of BPSK symbols, a legacy long training field (L-LTF) 208, which may consist of BPSK symbols, and a legacy signal field (L-SIG) 210, which may consist of BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
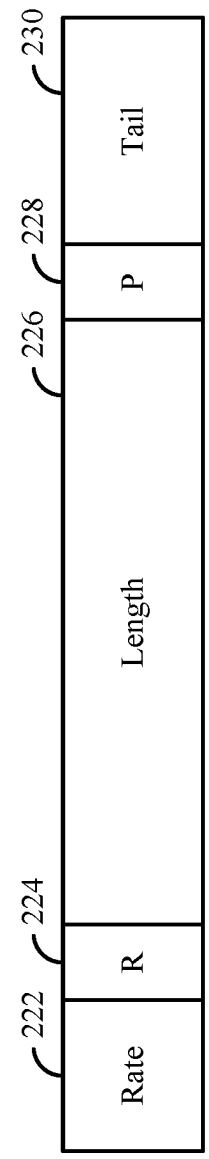
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds s) or other time units.

Figure 3A:
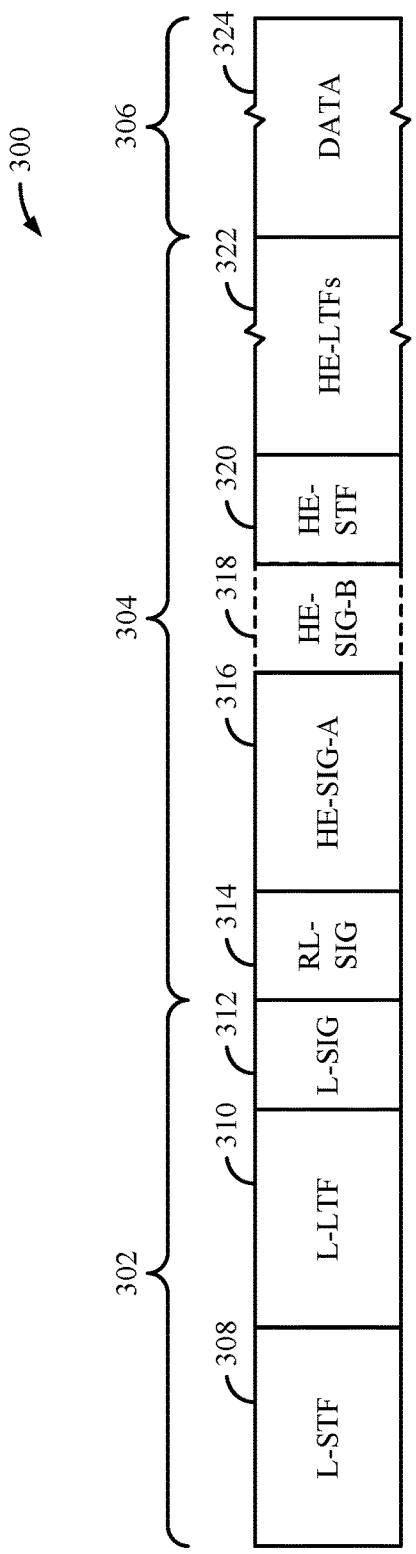
FIG. 3A shows an example PHY layer convergence protocol (PLCP) protocol data unit (PPDU) usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
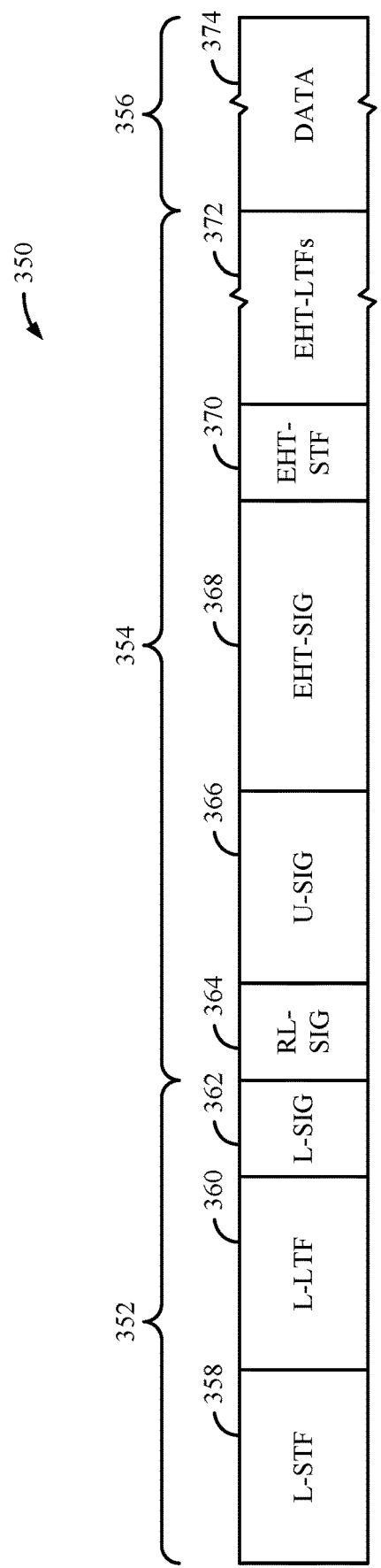
FIG. 3B shows another example PPDU usable for communications between an AP and one or more STAs.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374.

Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Figure 4:
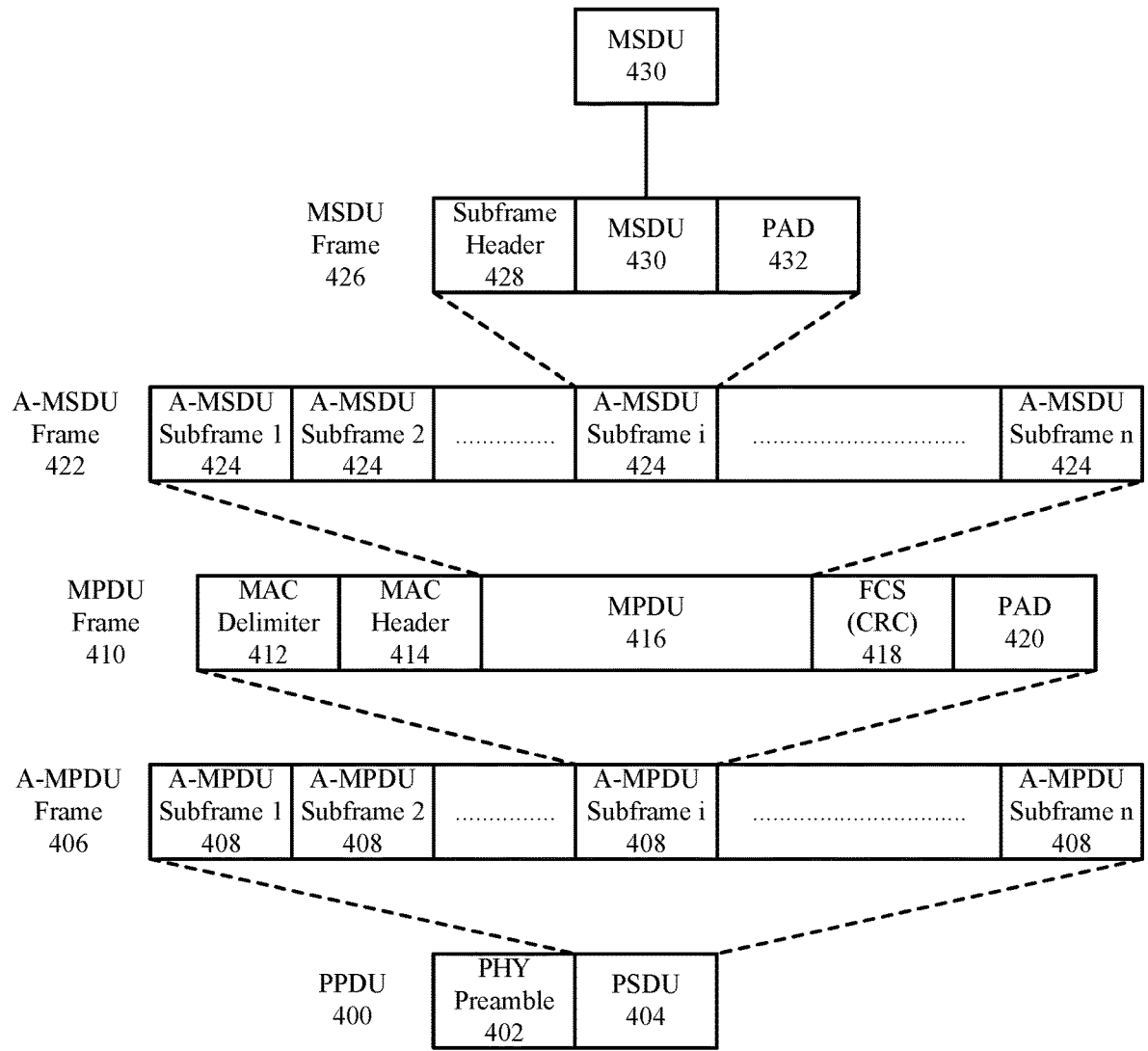
FIG. 4 shows an example PHY protocol data unit (PPDU) usable for communications between an AP and one or more STAs.

FIG. 4 shows an example PPDU 400 usable for communications between an AP 102 and one or more STAs 104. As described above, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which comprises the data portion ("payload" or "frame body") of the MPDU frame 410. Each MPDU frame 410 may also include a frame check sequence (FCS) field 418 for error detection (for example, the FCS field may include a cyclic redundancy check (CRC)) and padding bits 420. The MPDU 416 may carry one or more MAC service data units (MSDUs) 426. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Figure 5:
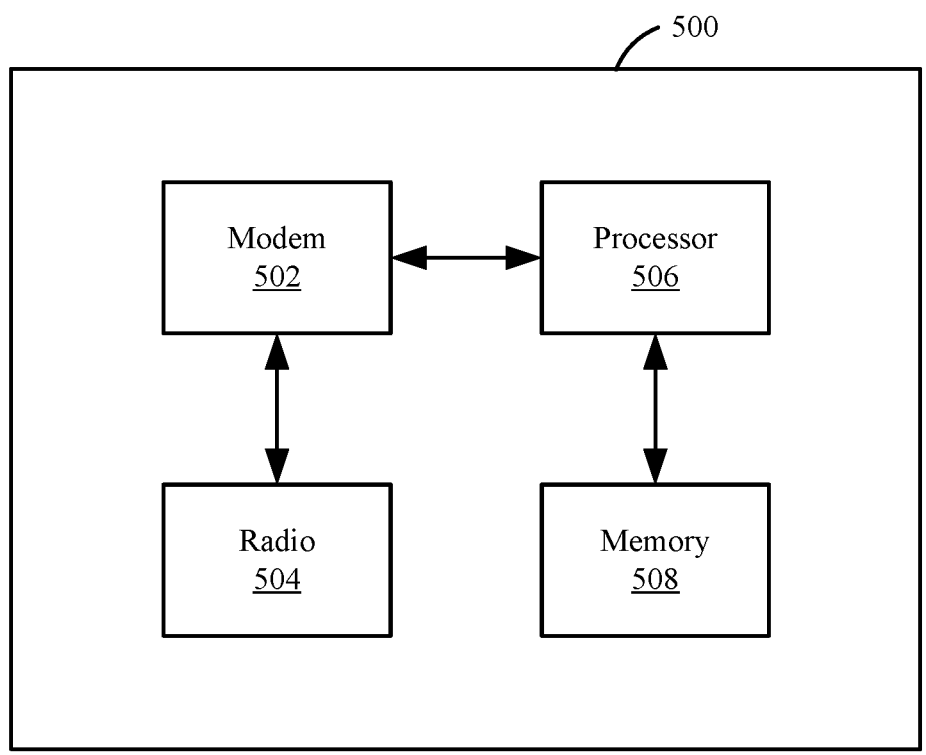
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described with reference to FIG. 1. In some implementations, the wireless communication device 500 can be an example of a device for use in an AP such as the AP 102 described with reference to FIG. 1. The wireless communication device 500 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
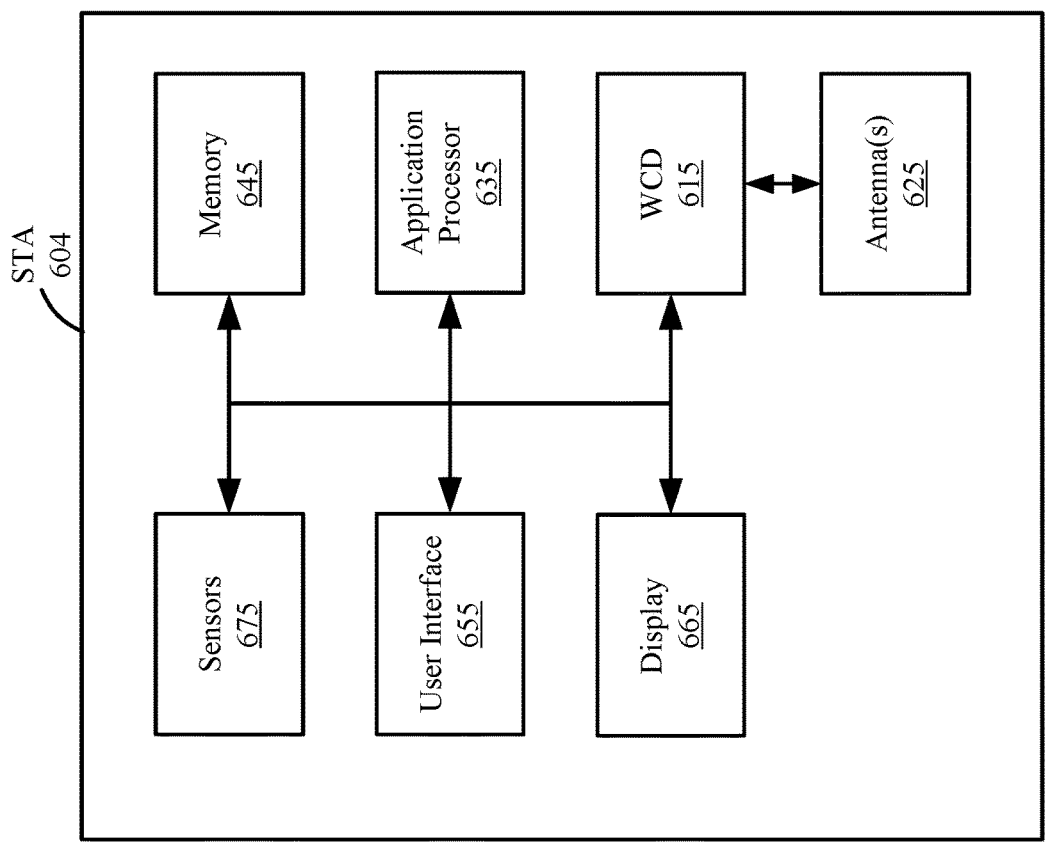
FIG. 6B shows a block diagram of an example station (STA).
Figure 6A:
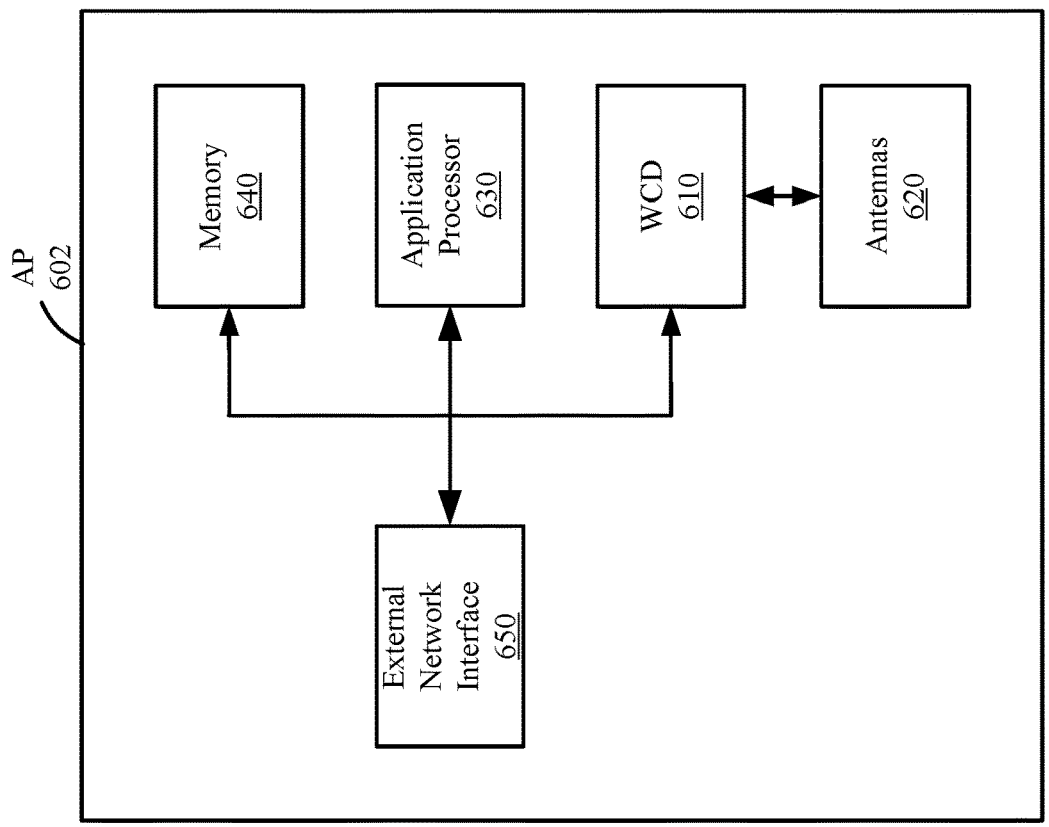
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7:
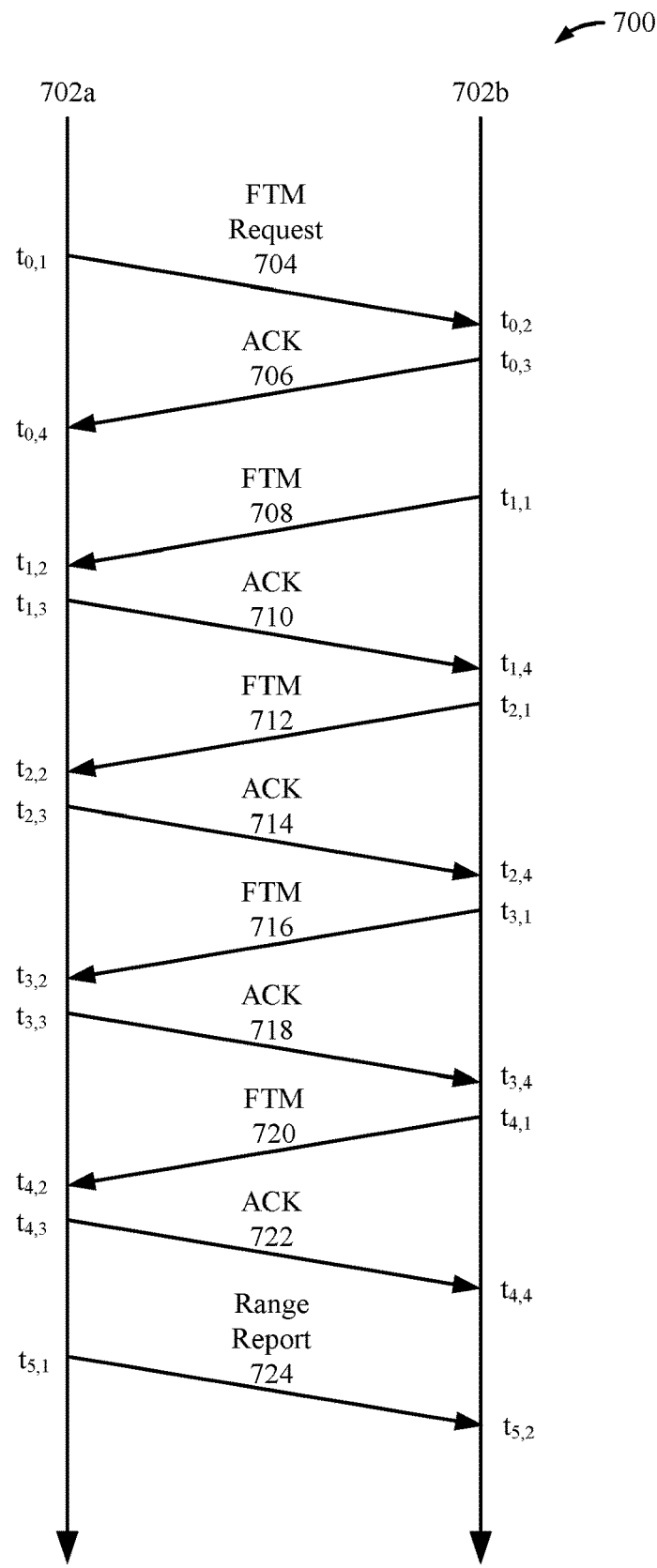
FIG. 7 shows a timing diagram illustrating an example process for performing a ranging operation.

Aspects of transmissions may vary based on a distance between a transmitter (for example, an AP 102 or a STA 104) and a receiver (for example, another AP 102 or STA 104). Wireless communication devices may generally benefit from having information regarding the location or proximities of the various STAs 104 within the coverage area. In some examples, relevant distances may be computed using ranging procedures based on round-trip time (RTT). Additionally, in some implementations, APs 102 and STAs 104 may be configured to perform ranging operations. Each ranging operation may involve an exchange of fine timing measurement (FTM) frames (such as those defined in the IEEE 802.11mc specification or revisions or updates thereof). FIG. 7 shows a timing diagram illustrating an example process for performing a ranging operation 700. The process for the ranging operation 700 may be conjunctively performed by two wireless devices 702a and 702b, which may each be an example of an AP 102 or a STA 104.

The ranging operation 700 begins with the first wireless device 702a transmitting an initial FTM range request frame 704 at time $t_{0,1}$. Responsive to successfully receiving the FTM range request frame 704 at time $t_{0,2}$, the second wireless device 702b responds by transmitting a first ACK 706 at time $t_{0,3}$, which the first wireless device 702a receives at time $t_{0,4}$. The first wireless device 702a and the second wireless device 702b then exchange one or more FTM bursts, which may each include multiple exchanges of FTM action frames (hereinafter simply "FTM frames") and corresponding ACKs. One or more of the FTM request frame 704 and the FTM action frames (hereinafter simply "FTM frames") may include FTM parameters specifying various characteristics of the ranging operation 700.

In the example shown in FIG. 7, in a first exchange, beginning at time $t_{1,1}$, the second wireless device 702b transmits a first FTM frame 708. The second wireless device 702b records the time $t_{1,1}$ as the time of departure (TOD) of the first FTM frame 708. The first wireless device 702a receives the first FTM frame 708 at time $t_{1,2}$ and transmits a first acknowledgement frame (ACK) 710 to the second wireless device 702b at time $t_{1,3}$. The first wireless device 702a records the time $t_{1,2}$ as the time of arrival (TOA) of the first FTM frame 708, and the time $t_{1,3}$ as the TOD of the first ACK 710. The second wireless device 702b receives the first ACK 710 at time $t_{1,4}$ and records the time $t_{1,4}$ as the TOA of the first ACK 710.

Similarly, in a second exchange, beginning at time $t_{2,1}$, the second wireless device 702b transmits a second FTM frame 712. The second FTM frame 712 includes a first field indicating the TOD of the first FTM frame 708 and a second field indicating the TOA of the first ACK 710. The first wireless device 702a receives the second FTM frame 712 at time $t_{2,2}$ and transmits a second ACK 714 to the second wireless device 702b at time $t_{2,3}$. The second wireless device 702b receives the second ACK 714 at time $t_{2,4}$. Similarly, in a third exchange, beginning at time $t_{3,1}$, the second wireless device 702b transmits a third FTM frame 716. The third FTM frame 716 includes a first field indicating the TOD of the second FTM frame 712 and a second field indicating the TOA of the second ACK 714. The first wireless device 702a receives the third FTM frame 716 at time $t_{3,2}$ and transmits a third ACK 718 to the second wireless device 702b at time $t_{3,3}$. The second wireless device 702b receives the third ACK 718 at time $t_{3,4}$. Similarly, in a fourth exchange, beginning at time $t_{4,1}$, the second wireless device 702b transmits a fourth FTM frame 720. The fourth FTM frame 720 includes a first field indicating the TOD of the third FTM frame 716 and a second field indicating the TOA of the third ACK 718.

The first wireless device 702a receives the fourth FTM frame 720 at time $t_{4,2}$ and transmits a fourth ACK 722 to the second wireless device 702b at time $t_{4,3}$. The second wireless device 702b receives the fourth ACK 722 at time $t_{4,4}$.

The first wireless device 702a determines a range indication based on the TODs and TOAs described above. For example, in implementations or instances in which an FTM burst includes four exchanges of FTM frames as described above, the first wireless device 702a may be configured to determine a round trip time (RTT) between itself and the second wireless device 702b based on Equation 1 below.

$$RTT = \frac{1}{3}\left(\sum_{k=1}^{3} t_{4,k} - \sum_{k=1}^{3} t_{1,k}\right) - \left(\sum_{k=1}^{3} t_{3,k} - \sum_{k=1}^{3} t_{2,k}\right) \quad (1)$$

In some implementations, the range indication is the RTT. Additionally, or alternatively, in some implementations, the first wireless device 702a may determine an actual approximate distance between itself and the second wireless device 702b, for example, by multiplying the RTT by an approximate speed of light in the wireless medium. In such instances, the range indication may additionally or alternatively include the distance value. Additionally, or alternatively, the range indication may include an indication as to whether the second wireless device 702b is within a proximity (for example, a service discovery threshold) of the first wireless device 702a based on the RTT. In some implementations, the first wireless device 702a may then transmit the range indication to the second wireless device 702b, for example, in a range report 724 at time $t_{5,1}$, which the second wireless device receives at time $t_{5,2}$.

Ranging operations (such as the ranging operation 700 of FIG. 7) may be used in various proximity-based applications such as, for example, unlocking a vehicle with a mobile phone. A wireless communication device within the mobile phone may communicate with a wireless communication device within the vehicle to perform FTM-based ranging operations such as described with respect to FIG. 7. For example, the mobile phone may indicate its distance to the vehicle by transmitting FTM frames to the vehicle and providing feedback (ACKs) regarding FTM frames received from the vehicle. Similarly, the vehicle may determine its distance to the mobile phone by transmitting FTM frames to the mobile phone and providing feedback (ACKs) regarding FTM frames received from the mobile phone. The vehicle may unlock its doors (or other compartments) if it determines that the mobile phone is within a threshold proximity of the vehicle.

Figures 8A, 8B:
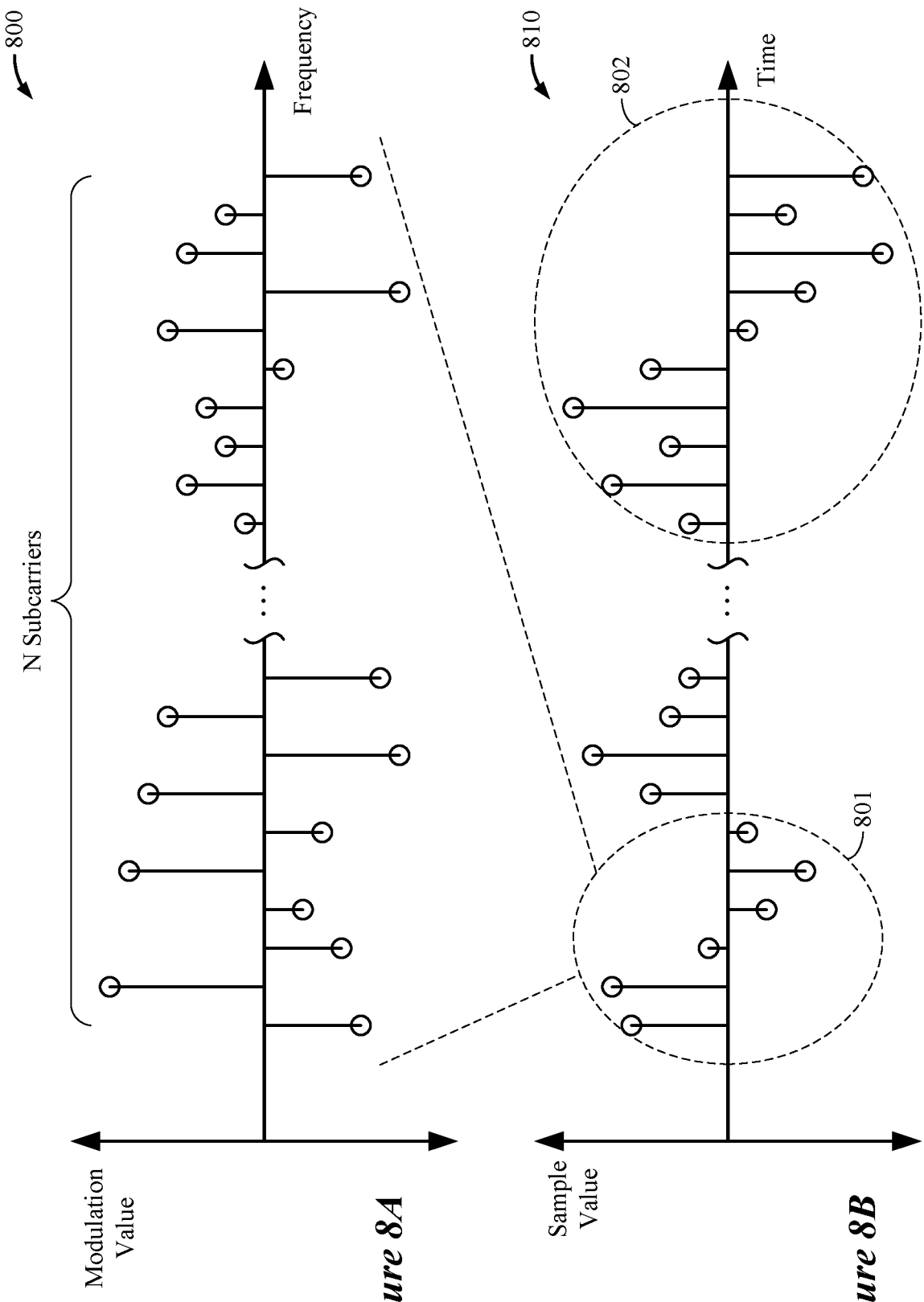
FIG. 8A shows a frequency diagram of an example long training field (LTF) sequence usable for communications between wireless communication devices.
FIG. 8B shows a timing diagram of an example LTF symbol usable for communications between wireless communication devices.

As described with reference to FIG. 7, distance calculations are based on TOAs and TODs of PPDUs (such as FTM frames and ACKs) exchanged between a first wireless communication device and a second wireless communication device. In some implementations, a wireless communication device may determine the TOA of an incoming PPDU based, at least in part, on the time at which the wireless communication device completes reception of an LTF field of the PPDU. The LTF field includes a number (L) of LTF sequences modulated on a number (N) of subcarriers. FIG. 8A shows a frequency diagram of an example LTF sequence 800 usable for communications between wireless communication devices. The LTF sequence 800 is a frequency-domain representation of an LTF symbol. As shown in FIG. 8A, a non-zero modulation symbol is modulated on each of the N subcarriers associated with the LTF sequence 800. Each modulation symbol may represent a number or pattern of bit values that depends on the type of modulation scheme being used. For example, modulation symbols mapped to a binary phase shift keying (BPSK) constellation may each represent a single bit (0 or 1). Similarly, modulation symbols mapped to a quadrature phase shift keying (QPSK) constellation may each represent a two-bit pattern (00, 01, 10, or 11). The sequence of modulation symbols mapped across all N subcarriers is collectively referred to as an "LTF sequence."

LTF sequences conforming to existing versions of the IEEE 802.11 standard are encoded or modulated based on deterministic functions. In other words, a wireless communication device with knowledge of the function used to generate the LTF sequence (such as defined by the IEEE 802.11 standards) may observe a portion of an LTF sequence and determine or predict the remainder of the LTF sequence based on the observed portion. FIG. 8B shows a timing diagram of an example LTF symbol 810 usable for communications between wireless communication devices. The LTF symbol 810 may be a time-domain representation of the LTF sequence 800 of FIG. 8A. An inverse Fourier transform may be used to map various modulation symbols spanning the bandwidth of the frequency-domain LTF sequence 800 to various portions of the time-domain LTF symbol 810. For example, a beginning portion 801 of the time-domain LTF symbol 810 may carry modulation symbols spread throughout the bandwidth of the frequency-domain LTF sequence 800.

Aspects of the present disclosure recognize that an attacker (or unintended receiving device) may intercept a beginning portion 801 of the LTF symbol 810 transmitted by a transmitting device to a receiving device. Using a deterministic function, the attacker may determine or predict the remainder of the LTF sequence based only on information included in the beginning portion 801. The attacker may then transmit a copy of a tail portion 802 of the LTF symbol 810 to the receiving device before the transmitting device has completed its transmission of the original LTF symbol 810. Accordingly, the attacker may trick the receiving device into thinking the transmitting device is closer than it actually is.

Various aspects relate generally to LTFs used in wireless communications, and more particularly, to generating a secure LTF that is difficult to decode or replicate by observing only a portion of the LTF. In some aspects, the secure LTF may include a randomized bit sequence that is difficult, if not impossible, to replicate by any device other than the transmitting device and the intended receiving device (using a secure key previously shared over a secure wireless link). For example, the transmitting device may use a block or a stream cipher to generate a pseudorandom bit sequence and may select a subset of bits of the pseudorandom bit sequence to be mapped to a sequence of modulation symbols representing an LTF symbol of the secure LTF. More specifically, each of the modulation symbols is mapped to a respective one of a number of subcarriers spanning a bandwidth of the secure LTF. The transmitting device may further transmit a PPDU that includes the secure LTF to the receiving device.

Particular implementations of the subject matter described in this disclosure can be implemented to realize one or more of the following potential advantages. In some implementations, the described techniques can be used to improve the security of LTFs used in wireless communications. For example, LTF sequences conforming to existing versions of the IEEE 802.11 standard are encoded or modulated based on deterministic functions. As a result, an attacker (or unintended receiving device) may receive a portion of an LTF sequence and determine or predict the remainder of the LTF sequence based on the received portion. A sophisticated attacker may even copy or spoof the LTF sequence before the transmitting device has finished transmitting the original LTF sequence to the receiving device. For example, the attacker may transmit the spoofed LTF sequence to the receiving device to cause errors in channel or timing measurements by the receiving device. By randomizing the modulation symbols associated with individual LTF sequences, aspects of the present disclosure may prevent or substantially delay such attacks on LTF sequences long enough to render the attacks ineffective.

Figure 9A:
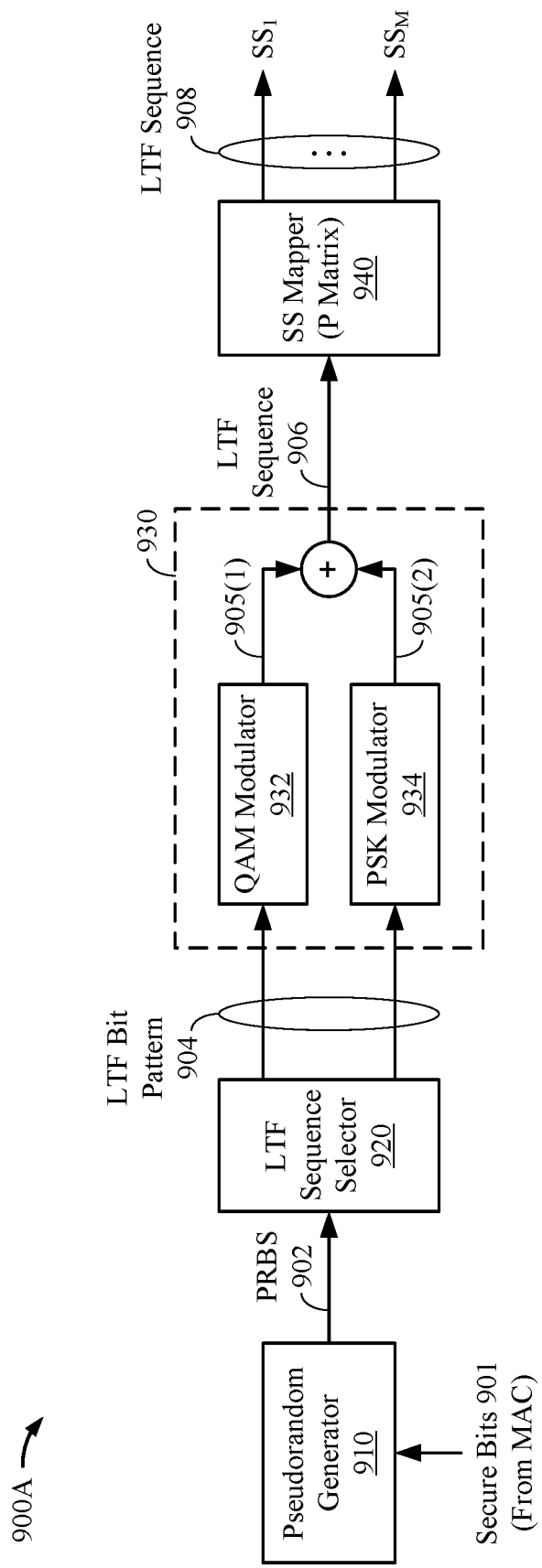
FIGS. 9A and 9B show block diagrams of an example transmit (TX) processing chain of a wireless communication device according to some implementations.
Figure 9B:
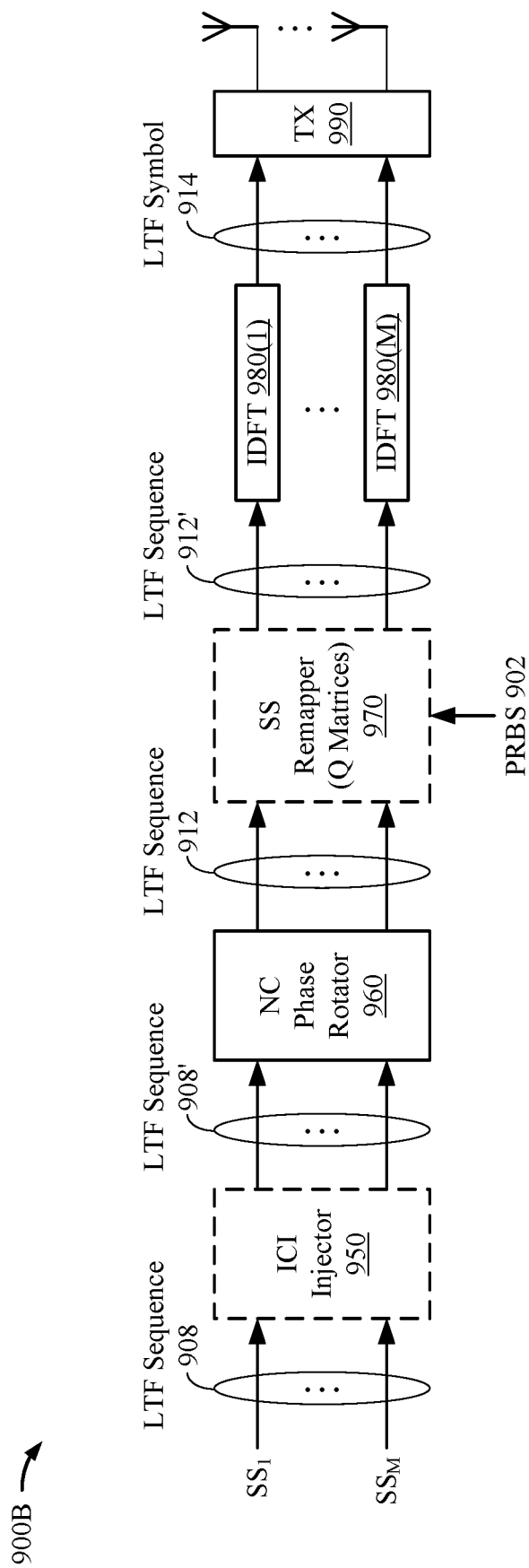

FIGS. 9A and 9B show block diagrams of an example transmit (TX) processing chain of a wireless communication device according to some implementations. In some implementations, the TX processing chain may be configured to transmit an LTF symbol 914 as part of an LTF field of a PPDU. For example, the PPDU may be an FTM frame. More specifically, FIG. 9A shows a first portion 900A of the TX processing chain and FIG. 9B shows a second portion 900B of the TX processing chain. In some implementations, the wireless communication device may be an AP such as APs 102 or 602 of FIGS. 1 and 6, respectively. In some other implementations, the wireless communication device may be a STA such as STAs 104 or 604 of FIGS. 1 and 6, respectively. With reference for example to FIG. 5, the TX processing chain may include portions of the modem 502 and the radio 504.

With reference to FIG. 9A, the first portion 900A of the TX processing chain includes a pseudorandom generator 910, an LTF sequence selector 920, a modulator 930, and a spatial stream (SS) mapper 940. The pseudorandom generator 910 is configured to generate a pseudorandom bit sequence (PRBS) 902. In some implementations, the pseudorandom generator 910 may generate the pseudorandom bit sequence 902 based on an output of a cipher such as, for example, an advanced encryption standard (AES) block cipher, a hash operation, or a stream cipher. Example suitable stream ciphers may include, but are not limited to, Grain and Grain-128a stream ciphers.

In some implementations, the pseudorandom generator 910 may be implemented in the PHY layer of the wireless communication device. For example, aspects of the present disclosure recognize that the control interface between the MAC layer and the PHY layer operates at relatively low speeds. Thus, it may not be feasible to implement the pseudorandom generator 910 in the MAC layer, as the interface would create a bottleneck in transferring a large pseudorandom bit sequence from the MAC layer to the PHY layer. In some aspects, the pseudorandom generator 910 may receive a relatively small number (<300) of secure bits 901 from the MAC layer to be used to initialize the cipher block. The secure bits 901 may include a key and an initialization vector.

The LTF sequence selector 920 selects a pattern of LTF bits 904 corresponding to a subset of the pseudorandom bit sequence 902 and the modulator 930 modulates the LTF bit pattern 904 onto a number (N) of subcarriers to produce an LTF sequence 906. As described with reference to FIG. 8A, the LTF sequence 906 may include a sequence of non-zero modulation symbols. Each modulation symbol of the LTF sequence 906 may represent a respective subset of bit values of the LTF bit pattern 904. Thus, an overall length (P) of the LTF bit pattern 904 may depend on a type of modulation scheme implemented by the modulator 930 (where P is a multiple of N).

In some implementations, the modulator 930 may implement a quadrature amplitude modulation (QAM) scheme. Higher-order modulation schemes (higher than QPSK) are generally more sensitive to intercarrier interference (ICI), which tends to degrade the performance of orthogonal frequency-division multiplexing (OFDM) transmissions. However, aspects of the present disclosure recognize that the presence of ICI in LTF transmissions increases the difficulty of decoding or replicating the LTF transmissions. In some aspects, the modulator 930 may implement a 16-QAM or higher-order modulation scheme (such as 64-QAM or 256-QAM, among other examples) to balance the advantages (increase decoding difficulty) with the disadvantages (degrade OFDM performance) of ICI. Since each 16-QAM symbol represents a pattern of four bits, the LTF sequence selector 920 may output an LTF bit pattern 904 of length 4N (P=4*N).

In some other implementations, the modulator 930 may implement a QAM scheme and a phase-shift keying (PSK) scheme. For example, in some aspects, the modulator 930 may include a QAM modulator 932 and a PSK modulator 934. The QAM modulator 932 may map a first subset of bits of the LTF bit pattern 904 to a set of QAM symbols 905(1) according to a QAM modulation technique (such as 64-QAM). The PSK modulator 934 may map a second subset of bits of the LTF bit pattern 904 to a set of PSK symbols 905(2) according to PSK modulation techniques (such as 4-PSK). The modulator 930 further combines the QAM symbols 905(1) with the PSK symbols 905(2) to produce the LTF sequence 906. By generating the LTF sequence 906 based on multiple modulation techniques (such as QAM and PSK), aspects of the present disclosure may further improve the security of the LTF transmissions. For example, by combining 64-QAM with 4-PSK modulation techniques, the resulting LTF sequence 906 may be as difficult to decode as a 256-QAM sequence while the ranging performance remains substantially the same as a 64-QAM sequence. As a result, the LTF sequence 906 is difficult, if not impossible, to predict by any device (other than the intended receiving device) when observing a portion of the secure LTF.

In some implementations, the LTF sequence selector 920 may select the LTF bit pattern 904 from a portion of the pseudorandom bit sequence 902. As described above, deterministic bit patterns (such as bit patterns with repetitions) in an LTF sequence may be easily decoded or replicated by an attacker. Further, the LTF field of a PPDU may include a number (L) of different LTF symbols representing L respective LTF sequences. To increase the difficulty of such attacks, the LTF sequence selector 920 may ensure that the LTF bit pattern 904 associated with each of the L LTF sequences includes a unique set or sequence of bits from the pseudorandom bit sequence 902.

In some implementations, the LTF sequence selector 920 may further select a different LTF bit pattern 904 for each of the L LTF sequences. Selecting a pseudorandom bit sequence for a particular LTF sequence increases the difficulty of decoding or replicating that LTF sequence within a single LTF symbol duration. However, a persistent attacker may eventually decode or replicate the LTF bit pattern 904. If the LTF bit pattern 904 for one of the L LTF sequences is reused for another one of the L LTF sequences, the attacker may spoof that subsequent LTF sequence. To increase the difficulty of such attacks, the LTF sequence selector 920 may ensure that a different LTF bit pattern 904 is selected, from the pseudorandom bit sequence 902, for each of the L LTF sequences.

The spatial stream mapper 940 maps the LTF sequence 906 onto a number (M) of spatial streams $SS_1$-$SS_M$ to produce a spatially-mapped LTF sequence 908. For example, the spatial stream mapper 940 may apply a spatial mapping matrix to the set of N modulation symbols of the LTF sequence 906. As a result of the spatial mapping, each of the N modulation symbols of the LTF sequence 906 is replicated on each of the M spatial streams $SS_1$-$SS_M$ (as the spatially-mapped LTF sequence 908). In some implementations, the spatial mapping matrix may be a P matrix such as defined, for example, by existing versions of the IEEE 802.11 standard.

Referring to FIG. 9B, the second portion 900B of the TX processing chain includes a non-cyclic (NC) phase rotator 960, M inverse discrete Fourier transforms (IDFTs) 980(1)-980(M), and a transmitter (TX) 990. In some implementations, the second portion 900B also may include an ICI injector 950 that may be configured to add one or more non-zero tones or subcarriers to the spatially-mapped LTF sequence 908 to produce an ICI-injected LTF sequence 908'. As described with reference to FIG. 9A, the presence of ICI in LTF transmissions increases the difficulty of decoding or replicating an LTF symbol from only a portion of the LTF symbol. Aspects of the present disclosure further recognize that ICI may be "added" or injected into the LTF sequence 908 by replacing one or more null subcarriers of the LTF sequence 908 with non-zero subcarriers.

Figure 10A:
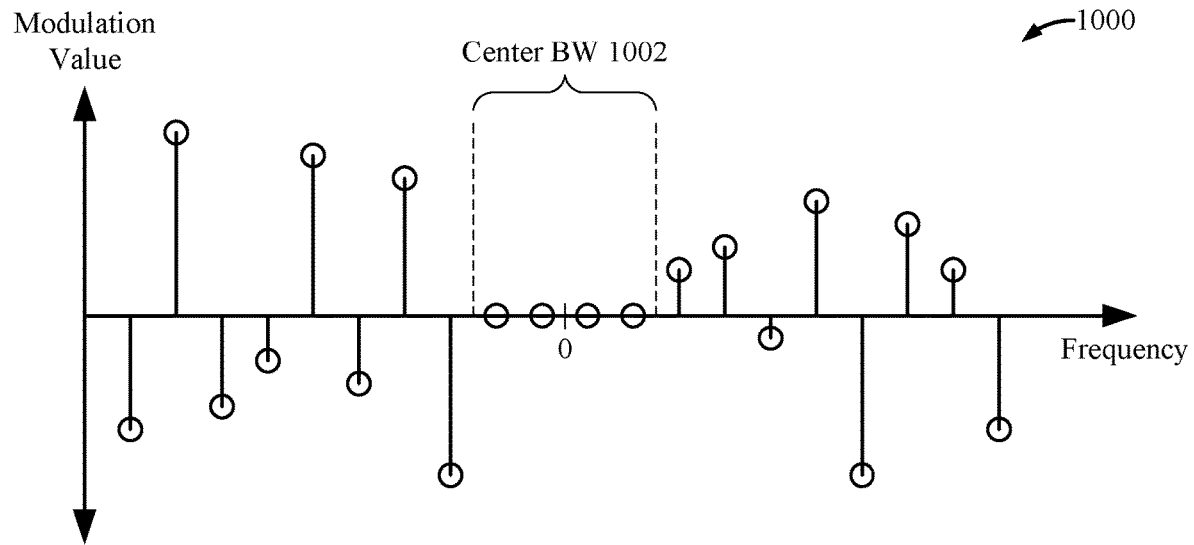
FIG. 10A shows a frequency diagram of an example LTF symbol prior to intercarrier interference (ICI) injection according to some implementations.

FIG. 10A shows a frequency diagram of an example LTF sequence 1000 prior to ICI injection according to some implementations. In the example of FIG. 10A, the wireless channel is subdivided into negative and positive subchannels. The negative subchannel (left of center frequency) includes negative-frequency subcarriers and the positive subchannel (right of center frequency) includes positive-frequency subcarriers. As shown in FIG. 10A, the LTF sequence 1000 includes several null subcarriers within a center bandwidth (BW) 1002 of the frequency band. Due to the presence of the null subcarriers, the non-zero subcarriers adjacent the center bandwidth 1002 tend to have less ICI than the other non-zero subcarriers of the LTF sequence 1000. Thus, to increase ICI for the non-zero subcarriers adjacent the center bandwidth 1002, the ICI injector 950 may replace one or more of the null subcarriers within the center bandwidth 1002 with non-zero subcarriers.

Figure 10B:
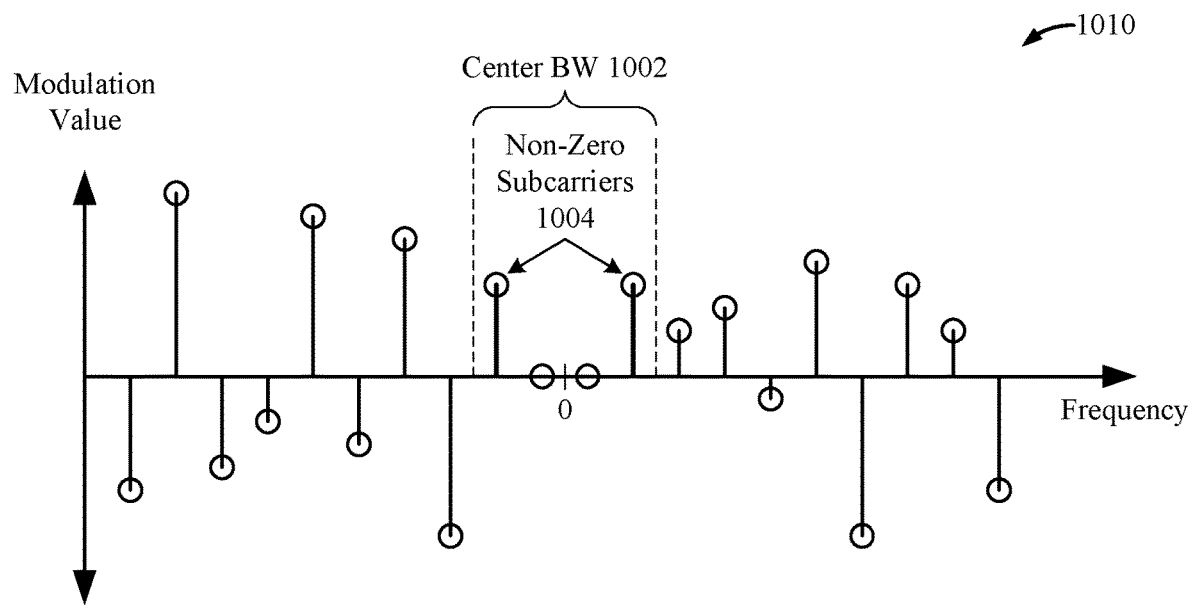
FIG. 10B shows a frequency diagram of an example LTF symbol after ICI injection according to some implementations.

FIG. 10B shows a frequency diagram of an example LTF sequence 1010 after ICI injection according to some implementations. In some implementations, the LTF sequence 1010 may be an example of the LTF sequence 1000 after the replacement of one or more null subcarriers with non-zero subcarriers. In the example of FIG. 10B, the subcarriers at the edges of the center bandwidth 1002 have been replaced with non-zero subcarriers 1004. In some implementations, the modulation symbols of the non-zero subcarriers 1004 may be the same for each spatial stream to which the LTF sequence 1010 is mapped. With reference for example to FIG. 9B, the ICI injector 950 may inject the same modulation symbols into the LTF sequence 908 for each of the spatial streams $SS_1$-$SS_M$. In some other implementations, the modulation symbols of the non-zero subcarriers 1004 may be different for different spatial streams. With reference for example to FIG. 9B, the ICI injector 950 may inject different modulation symbols into the LTF sequence for each of the spatial streams $SS_1$-$SS_M$.

The non-cyclic phase rotator 960 is configured to add phase rotations or offsets to the various spatial streams $SS_1$-$SS_M$ associated with the LTF sequence 908' (or LTF sequence 908) to produce a rotated LTF sequence 912. For example, the phase offsets may prevent unintentional beamforming at the receiving device. Unintentional beamforming may result from constructive (or destructive) interference of multiple spatial streams caused by multipath propagation. In accordance with existing versions of the IEEE 802.11 standard, cyclic shift diversity (CSD) would be applied to the various spatial streams to offset the phases of each spatial stream and thus avoid unintentional beamforming at the receiving device. However, aspects of the present disclosure recognize that CSD may not be suitable for secure LTFs. Because the phase rotations are cyclic, an attacker can observe the CSD on one or more spatial streams and use the knowledge of the CSD to predict the phase offset of the LTF transmitted on another spatial stream.

In some implementations, the non-cyclic phase rotator 960 may apply non-cyclic phase rotations to the modulation symbols modulated on the various spatial streams $SS_1$-$SS_M$. As a result, the phase rotations applied to one of the spatial streams $SS_1$-$SS_M$ cannot be determined by cyclically delaying or shifting the phase rotations applied to another of the spatial streams $SS_1$-$SS_M$. In some aspects, the non-cyclic phase rotator 960 may apply pseudorandom phase rotations across the various subcarriers associated with each of the spatial streams $SS_1$-$SS_M$. More specifically, the non-cyclic phase rotator 960 may apply a different set of pseudorandom phase rotations to each of the spatial streams $SS_1$-$SS_M$ (for a total of M sets of pseudorandom phase rotations). In some other aspects, the non-cyclic phase rotator 960 may apply a number (K) of different phase rotations per spatial stream to the modulation symbols modulated on various subcarriers associated with the LTF sequence 908'.

In some implementations, the number K of phase rotations may be less than the number N of subcarriers associated with the LTF sequence 908' (K<N). As a result, at least one of the K phase rotations may be applied to two or more modulation symbols modulated on different subcarriers. Aspects of the present disclosure recognize that applying fully pseudorandom phase rotations across all N subcarriers (where K=N) creates diversity in the ICI, which weakens the security of the LTF. For example, because each of the L LTF sequences is replicated on each of the spatial streams $SS_1$-$SS_M$, an attacker may determine the N phase rotations based on differences in ICI between multiple spatial streams. In contrast, applying the same phase rotation to multiple modulation symbols on different subcarriers leads to consistent ICI across different spatial streams, thereby improving the security of the LTF.

In some implementations, the non-cyclic phase rotator 960 may group the N subcarriers into K subcarrier groups and apply a respective one of the K phase rotations to each of the modulation symbols associated with a particular group of subcarriers. In other words, the non-cyclic phase rotator 960 may apply the same phase rotation to each modulation symbol modulated on the subcarriers belonging to the same subcarrier group. In some aspects, each subcarrier group may correspond to a respective frequency sub-band. For example, each subcarrier group may span a range of frequencies (such as 20 MHz). In some aspects, the number K of subcarrier groups may be fixed or non-variable. Accordingly, the non-cyclic phase rotator 960 may assign a number (S) of subcarriers to each subcarrier group based on the total number of subcarrier groups (for example, S=N/K). In some other aspects, the number S of subcarriers per subcarrier group may be fixed or non-variable. Accordingly, the non-cyclic phase rotator 960 may determine the number K of subcarrier groups based on the total number of subcarriers to be assigned to each subcarrier group (for example, K=N/S).

The non-cyclic phase rotator 960 may generate a different set of K unique phase rotations for each of the spatial streams $SS_1$-$SS_M$, for example, to produce M*K unique phase rotations. In some implementations, the non-cyclic phase rotator 960 may generate the M sets of K phase rotations based on a pseudorandom function. For example, the M sets of K phase rotations may be generated based on an output of a linear feedback shift register (LFSR). To ensure that none of the K phase rotations for a given spatial stream is repeated for the same subcarrier group on another spatial stream, the non-cyclic phase rotator 960 may select the M*K unique phase rotations from unique portions of the output of the LFSR. The non-cyclic phase rotator 960 may reset the state of the LFSR after generating the M*K unique phase rotations for a given LTF sequence. This ensures that the same M*K unique phase rotations can be reproduced for the next LTF sequence.

In some other implementations, the non-cyclic phase rotator 960 may generate the M sets of phase rotations based on a deterministic function. For example, the non-cyclic phase rotator 960 may systematically derive each of the M*K unique phase rotations. Such a systematic function may ensure that none of the K phase rotations for a given spatial stream is repeated for the same subcarrier group on another spatial stream. In some aspects, the K phase rotations may be generated according to a substantially linear function. For example, each of the K phase rotations may represent a respective phase associated with a linear "phase ramp." The non-cyclic phase rotator 960 may apply the linear phase rotations in order of increasing magnitude to modulation symbols associated with a first range of frequencies and may apply the linear phase rotations in order of decreasing magnitude to modulation symbols associated with a second range of frequencies.

Figure 11A:
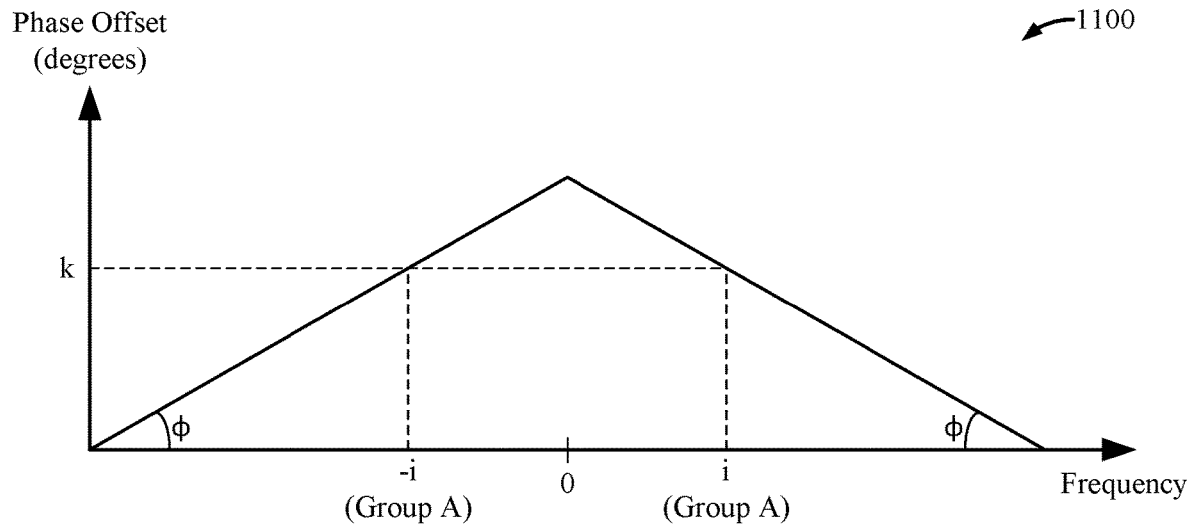
FIG. 11A shows a frequency diagram of an example phase ramp according to some implementations.

FIG. 11A shows a frequency diagram of an example phase ramp 1100 according to some implementations. In the example of FIG. 11A, the wireless channel is subdivided into negative and positive subchannels (to the left and right, respectively, of center frequency). The phase ramp 1100 is depicted as a linear curve having a positive slope in the negative subchannel and a linear curve having a negative slope in the positive subchannel. In some implementations, each of the K unique phase rotations may represent a respective line along the vertical axis which intersects the linear curves in the negative and positive subchannels. As shown in FIG. 11A, the $k^{th}$ phase rotation may be applied to the $i^{th}$ subcarrier and the $-i^{th}$ subcarrier. Accordingly, the $i^{th}$ and $-i^{th}$ subcarriers may belong to the same subcarrier group (group A). The K unique phase rotations may be applied, in ascending order, to the modulation symbols modulated on negative-frequency subcarriers. In other words, the magnitudes of the phase rotations increase as the frequencies of the subcarriers increase. The K unique phase rotations may be further applied, in descending order, to the modulation symbols modulated on positive-frequency subcarriers. In other words, the magnitudes of the phase rotations decrease as the frequencies of the subcarriers increase.

Figure 11B:
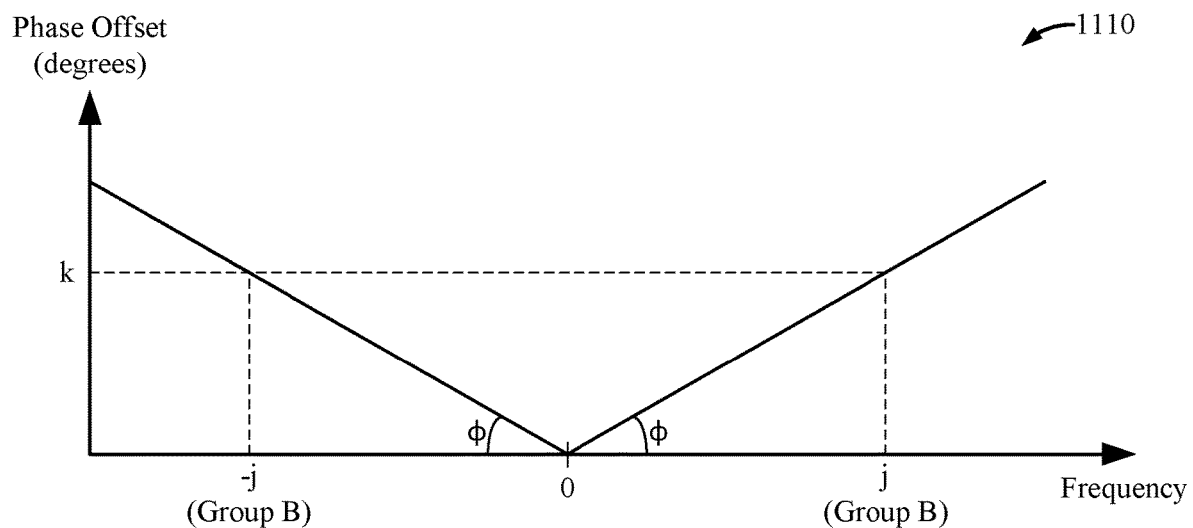
FIG. 11B shows a frequency diagram of an example phase ramp according to some implementations.

FIG. 11B shows a frequency diagram of an example phase ramp 1110 according to some implementations. In the example of FIG. 11B, the wireless channel is again subdivided into negative and positive subchannels. The phase ramp 1110 is depicted as a linear curve having a negative slow in the negative subchannel and a linear curve having a positive slope in the positive subchannel. In some implementations, each of the K unique phase rotations may represent a respective line along the vertical axis which intersects the linear curves in the negative and positive subchannels. The $k^{th}$ phase rotation may be applied to the $j^{th}$ subcarrier and the $-j^{th}$ subcarrier. Accordingly, the $j^{th}$ and $-j^{th}$ subcarriers may belong to the same subcarrier group (group B). The K unique phase rotations may be applied, in descending order, to the modulation symbols modulated on negative-frequency subcarriers. In other words, the magnitudes of the phase rotations decrease as the frequencies of the subcarriers increase. The K unique phase rotations also may be further applied, in ascending order, to the modulation symbols modulated on positive-frequency subcarriers. In other words, the magnitudes of the phase rotations increase as the frequencies of the subcarriers increase.

Referring back to FIG. 9B, the non-cyclic phase rotator 960 may apply a phase ramp (such as the phase ramp 1100 or phase ramp 1110 of FIGS. 11A and 11B, respectively) to the modulation values of the LTF sequence 908' (or LTF sequence 908). To avoid unintentional beamforming, the non-cyclic phase rotator 960 may adjust the slopes or offsets of the phase ramps for different spatial streams, thus varying the magnitudes of the K phase rotations applied to each of the spatial streams $SS_1$-$SS_M$. In some implementations, the non-cyclic phase rotator 960 may adjust the slopes of the phase ramps by changing the degree of incline or decline associated with each slope. For example, the non-cyclic phase rotator 960 may apply phase ramp 1100 or phase ramp 1110 to multiple spatial streams but with varying degrees of slope angle ($\phi$). In some instances, the slope angle may be zero ($\phi=0$), in which case the non-cyclic phase rotator 960 effectively does not apply a phase ramp on the given spatial stream. In some other implementations, the non-cyclic phase rotator 960 may adjust the slopes of the phase ramps by inverting the slope or curve. For example, the non-cyclic phase rotator 960 may alternately apply phase ramp 1100 and phase ramp 1110 to two or more spatial streams. Still further, in some implementations, the non-cyclic phase rotator 960 may adjust the offsets of the phase ramps by adding a fixed phase rotation to each of the K unique phase rotations. For example, the non-cyclic phase rotator 960 may move the phase ramps 1100 or 1110 up or down along the vertical axis when applied to different spatial streams.

In some implementations, the non-cyclic phase rotator 960 may apply an optimized set of K unique phase rotations for each of the M spatial streams $SS_1$-$SS_M$. The optimized phase rotations may be configured to minimize the correlation of the LTF sequence between the spatial streams $SS_1$-$SS_M$. Example optimized phase rotation matrices $\theta_{K,M}$ are shown below for LTF sequences mapped to K subcarrier groups and M spatial streams.

$$\theta_{2,8} = \begin{pmatrix} 1 & 1 & 1 & 1 & 1 & -j & -1 & j \\ 1 & -j & -1 & j & 1 & 1 & 1 & 1 \end{pmatrix}$$

$$\theta_{4,8} = \begin{pmatrix} 1 & 1 & 1 & 1 & 1 & -j & -j & j \\ 1 & 1 & -j & 1 & 1 & -j & 1 & j \\ 1 & -j & -j & j & 1 & 1 & 1 & 1 \\ 1 & -j & 1 & j & 1 & 1 & -j & 1 \end{pmatrix}$$

In some implementations, a particular LTF sequence may be repeated (or retransmitted) one or more times in the LTF field of a PPDU. Such repetitions are to ensure consistent channel estimations by the receiving device. For example, noise or interference in the wireless channel may affect the LTF sequences received by the receiving device. By including repetitions of one or more LTF sequences, the receiving device may check for consistency among the channel estimates associated with such LTF sequences. Aspects of the present disclosure recognize that, in some instances, multiple transmissions of the same LTF sequence can result in residual beamforming. To avoid residual beamforming, the non-cyclic phase rotator 960 may apply a different set of K unique phase rotations to each repetition of the same LTF sequence.

In some implementations, the TX processing chain may include a spatial stream (SS) remapper 970. The spatial stream remapper 970 may be implemented in lieu of, or addition to, the non-cyclic phase rotator 960. The spatial stream remapper 970 may be configured to (further) reduce or eliminate unintended beamforming by remapping the spatially-mapped LTF sequence 908, the ICI-injected LTF sequence 908', or the rotated LTF sequence 912, across the spatial streams $SS_1$-$SS_M$ to produce a remapped LTF sequence 912'. In some implementations, the spatial stream remapper 970 may apply a different unitary matrix (referred to herein as a "Q matrix") to each subcarrier group associated with the received LTF sequence. The Q matrix changes the mapping of the modulation symbols across the spatial streams $SS_1$-$SS_M$ on a per-group basis. In some aspects, the spatial stream remapper 970 may randomly select the Q matrices to be applied to a particular LTF sequence. For example, the spatial stream remapper 970 may randomly select the Q matrices, from a number of stored Q matrices, based on the pseudorandom bit sequence 902.

The IDFTs 980(1)-980(M) convert the LTF sequences on the spatial streams $SS_1$-$SS_M$, respectively, from the frequency domain to the time domain. For example, each IDFT 980 may produce a respective series of time-varying samples representative of the LTF sequence (such as illustrated in FIG. 8B). The series of samples output by the IDFTs 980(1)-980(M) represents a time-domain LTF symbol 914. The LTF symbol 914 is provided to the transmitter 990 for transmission, over a wireless channel, to a receiving device. The transmitter 990 may include one or more power amplifiers to amplify the LTF symbol 914 on each of the spatial streams $SS_1$-$SS_M$ for transmission via at least M transmit antennas.

Figure 12A:
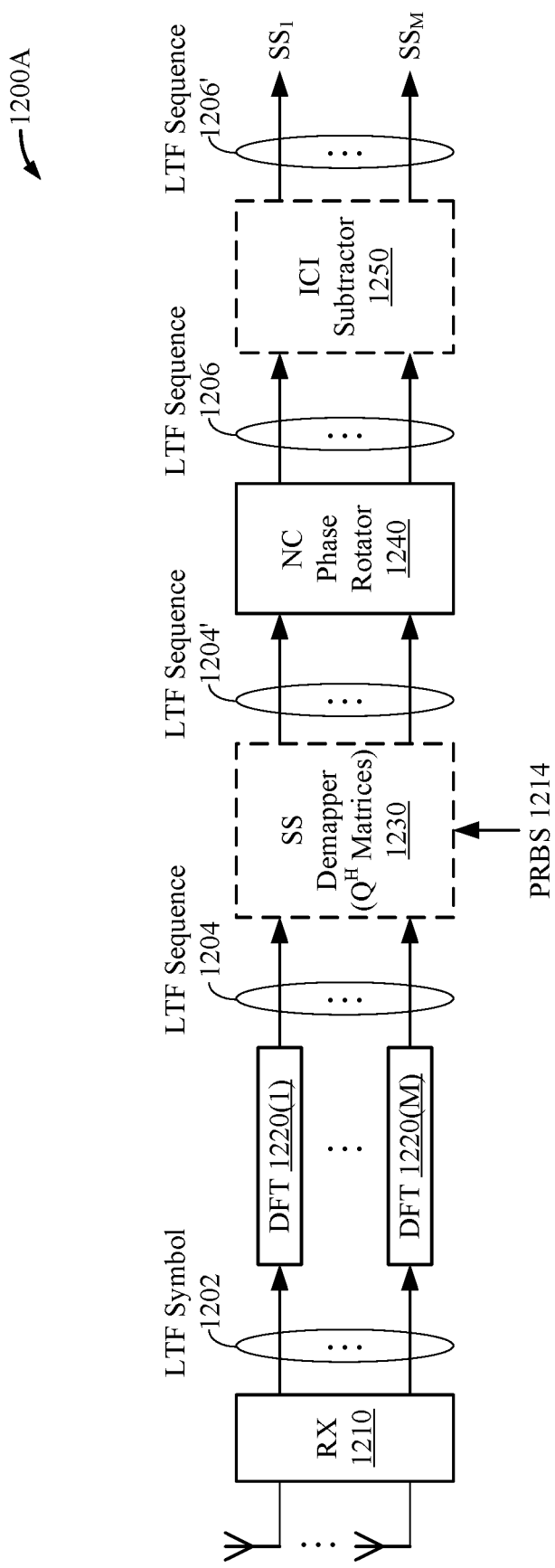
FIGS. 12A and 12B show block diagrams of an example receive (RX) processing chain of a wireless communication device according to some implementations.
Figure 12B:
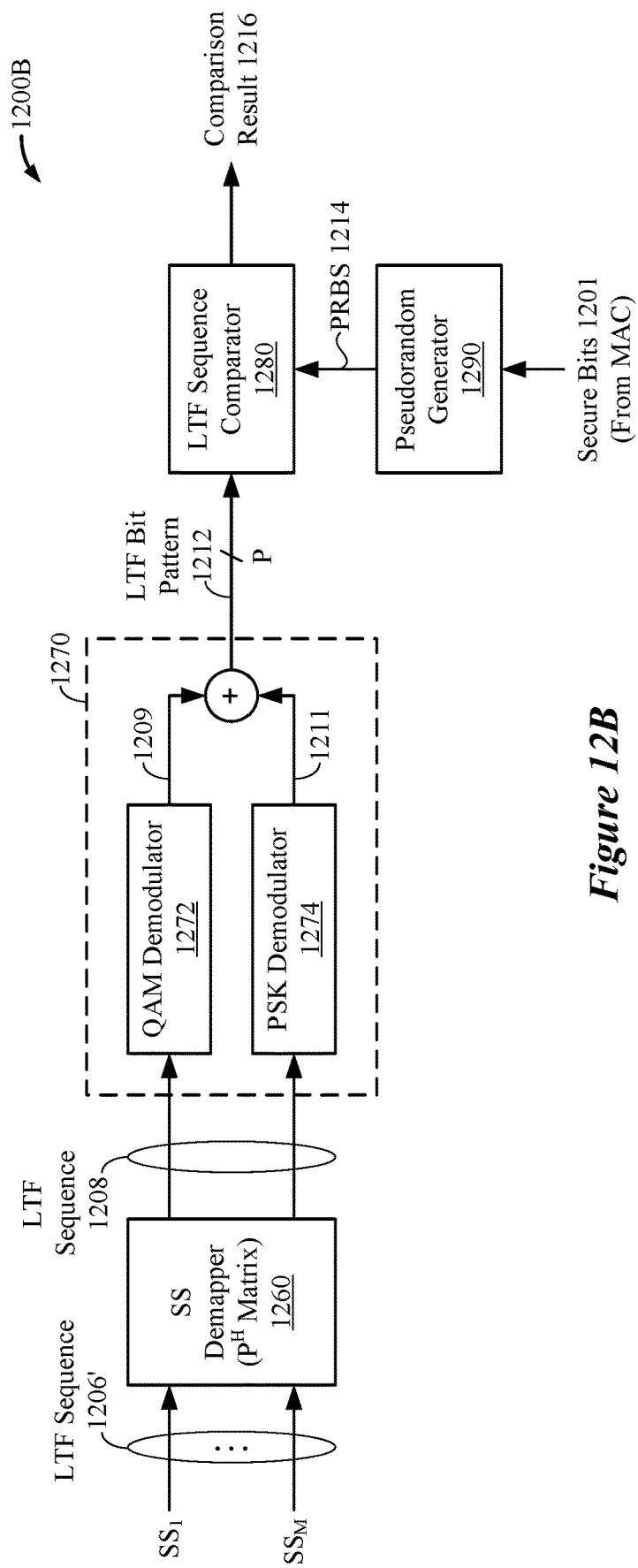

FIGS. 12A and 12B show block diagrams of a receive (RX) processing chain of a wireless communication device according to some implementations. More specifically, FIG. 12A shows a first portion 1200A of the RX processing chain and FIG. 12B shows a second portion 1200B of the RX processing chain. In some implementations, the wireless communication device may be an AP such as APs 102 or 602 of FIGS. 1 and 6, respectively. In some other implementations, the wireless communication device may be a STA such as STAs 104 or 604 of FIGS. 1 and 6, respectively. With reference for example to FIG. 5, the RX processing chain may include portions of the modem 502 and the radio 504.

With reference to FIG. 12A, the first portion 1300A of the RX processing chain includes a receiver (RX) 1210, a number (M) of discrete Fourier transforms (DFTs) 1220(1)-1220(M), and a non-cyclic (NC) phase rotator 1240. The receiver may receive a time-domain LTF symbol 1202, over a wireless channel, from a transmitting device. In some aspects, the LTF symbol 1202 may be transmitted as part of an LTF field of a PPDU. For example, the PPDU may be an FTM frame. In some aspects, the receiver 1210 may receive the LTF symbol 1210 on M spatial streams $SS_1$-$SS_M$ via at least M receive antennas. The receiver 1210 may include one or more low noise amplifiers (LNAs) to amplify the LTF symbol 1202 on each of the spatial streams $SS_1$-$SS_M$. The DFTs 1220(1)-1220(M) convert the LTF symbol 1202 on the spatial streams $SS_1$-$SS_M$, respectively, from the time domain to the frequency domain. For example, each DFT 1220 may produce a respective sequence of modulation symbols representative of the LTF symbol 1202 (such as illustrated in FIG. 8A). The sequence of modulation symbols output by the DFTs 1220(1)-1220(M) represents a frequency-domain LTF sequence 1204.

In some implementations, the RX processing chain may include an initial spatial stream (SS) demapper 1230. The initial spatial stream demapper 1230 may be configured to reverse or undo a spatial stream mapping (or remapping) performed by the spatial stream remapper 970 of FIG. 9B. For example, the spatial stream demapper 1230 may apply a conjugate transpose of the Q matrix (referred to herein as a "$Q^H$ matrix") to each subcarrier group associated with the LTF sequence 1204. The $Q^H$ matrix reverses the mapping (by the Q matrix) of the modulation symbols across the spatial streams $SS_1$-$SS_M$ per subcarrier group. In some aspects, the spatial stream demapper 1230 may randomly select the $Q^H$ matrices to be applied to a particular LTF sequence 1204. For example, the spatial stream remapper 970 may randomly select the $Q^H$ matrices, from a number of stored $Q^H$ matrices, based on a pseudorandom bit sequence 1214. In some implementations, the pseudorandom bit sequence 1214 may be identical to a pseudorandom bit sequence used to generate the LTF sequence 1204 (such as the pseudorandom bit sequence 902 of FIGS. 9A and 9B).

The non-cyclic phase rotator 1240 is configured to add phase rotations or offsets to the various spatial streams $SS_1$-$SS_M$ associated with the LTF sequence 1204' (or LTF sequence 1204) to recover a de-rotated LTF sequence 1206. In some aspects, the non-cyclic phase rotator 1240 may be configured to reverse or undo a set of phase rotations added to the LTF sequence 1204' (or LTF sequence 1204) by the non-cyclic phase rotator 960 of FIG. 9B. For example, the non-cyclic phase rotator 1240 also may apply non-cyclic phase rotations to the modulation symbols modulated on the various spatial streams $SS_1$-$SS_M$. In some aspects, the non-cyclic phase rotator 1240 may apply pseudorandom phase rotations across the various subcarriers associated with each of the spatial streams $SS_1$-$SS_M$. More specifically, the non-cyclic phase rotator 1240 may apply a different set of pseudorandom phase rotations to each of the spatial streams $SS_1$-$SS_M$ (for a total of M sets of pseudorandom phase rotations). In some other aspects, the non-cyclic phase rotator 1240 may apply a number (K) of different phase rotations per spatial stream to the modulation symbols modulated on various subcarriers associated with the LTF sequence 1204'.

In some implementations, the non-cyclic phase rotator 1240 may group a number (N) of subcarriers associated with the LTF sequence 1204' into K subcarrier groups and apply a respective one of the K phase rotations to each of the modulation symbols associated with a particular subcarrier group. The non-cyclic phase rotator 960 may apply the same phase rotation to each modulation symbol modulated on the subcarriers within the same subcarrier group. In some aspects, the number K of subcarrier groups may be fixed or non-variable. Accordingly, the non-cyclic phase rotator 1240 may assign a number (S) of subcarriers to each subcarrier group based on the total number of subcarrier groups (for example, S=N/K). In some other aspects, the number S of subcarriers per subcarrier group may be fixed or non-variable. Accordingly, the non-cyclic phase rotator 1240 may determine the number K of subcarrier groups based on the total number of subcarriers to be assigned to each subcarrier group (for example, K=N/S).

The non-cyclic phase rotator 1240 may generate a different set of K unique phase rotations for each of the spatial streams $SS_1$-$SS_M$, for example, to produce M*K unique phase rotations. In some implementations, the non-cyclic phase rotator 1240 may generate the M sets of K phase rotations based on a pseudorandom function. For example, the M sets of K phase rotations may be generated based on an output of an LFSR. In some aspects, the non-cyclic phase rotator 1240 may select the M*K unique phase rotations from unique portions of the output of the LFSR. The non-cyclic phase rotator 1240 may reset the state of the LFSR after generating the M*K unique phase rotations for a given LTF sequence.

In some other implementations, the non-cyclic phase rotator 1240 may generate the M sets of phase rotations based on a deterministic function. For example, the non-cyclic phase rotator 1240 may systematically derive each of the M*K unique phase rotations. In some aspects, the K phase rotations may be generated according to a substantially linear function. For example, each of the K phase rotations may represent a respective phase associated with a linear phase ramp (such as the phase ramps 1100 or 1110 of FIGS. 11A and 11B, respectively). With reference for example to FIGS. 11A and 11B, the non-cyclic phase rotator 1240 may apply the linear phase rotations in order of increasing magnitude to modulation symbols associated with a first range of frequencies and may apply the linear phase rotations in order of decreasing magnitude to modulation symbols associated with a second range of frequencies.

The non-cyclic phase rotator 1240 may adjust the slopes or offsets of the phase ramps for different spatial streams, thus varying the magnitudes of the K phase rotations applied to each of the spatial streams $SS_1$-$SS_M$. In some implementations, the non-cyclic phase rotator 1240 may adjust the slopes of the phase ramps by changing the degree of incline or decline associated with each slope. In some other implementations, the non-cyclic phase rotator 1240 may adjust the slopes of the phase ramps by inverting the slope or curve. Still further, in some implementations, the non-cyclic phase rotator 1240 may adjust the offsets of the phase ramps by adding a fixed phase rotation to each of the K unique phase rotations.

The non-cyclic phase rotator 1240 also may detect one or more repeated LTF sequences in an LTF field of a received PPDU. In some implementations, the non-cyclic phase rotator 1240 may apply a different set of K unique phase rotations to each repetition of the same LTF sequence. More specifically, the non-cyclic phase rotator 1240 may reverse or undo the different sets of K unique phase rotations applied to each repetition of the same LTF sequence by a non-cyclic phase rotator 1240 used to transmit the LTF sequences.

In some implementations, the RX processing chain may include an intercarrier interference (ICI) subtractor 1250 that may be configured to remove or undo one or more non-zero subcarriers added to the LTF sequence 1206 by the ICI injector 950 of FIG. 9B. As described with reference to FIGS. 10A and 10B, the ICI injector 950 may replace one or more null subcarriers adjacent a center bandwidth of the LTF sequence 1206 with non-zero subcarriers (such as the non-zero null subcarriers 1004 of FIG. 10B). The additional non-zero subcarriers are to increase the ICI of the LTF sequence 1206 and do not carry useful information. Thus, the ICI subtractor 1250 may remove these additional non-zero subcarriers from the LTF sequence 1206 to produce an ICI-adjusted LTF sequence 1206'.

Referring to FIG. 12B, the second portion 1200B of the RX processing chain includes a spatial stream (SS) demapper 1260, a demodulator 1270, an LTF sequence comparator 1280, and a pseudorandom generator 1290. The SS demapper 1260 may be configured to reverse or undo a spatial stream mapping performed by the spatial stream mapper 940 of FIG. 9A. For example, the spatial stream demapper 1230 may apply a conjugate transpose of the P matrix (referred to herein as a "$P^H$ matrix") to the LTF sequence 1206' (or LTF sequence 1206) to recover a de-mapped LTF sequence 1208. As a result of the de-mapping, the modulation symbols received on the M spatial streams $SS_1$-$SS_M$ are consolidated into a single frequency-domain LTF sequence.

The demodulator 1270 demodulates the LTF sequence 1208 to recover an LTF bit pattern 1212. In some aspects, the demodulator 1270 may be configured to reverse or undo a modulation performed by the modulator 930 of FIG. 9A. As described with reference to FIG. 8A, the LTF sequence 1208 may include a sequence of non-zero modulation symbols (the LTF sequence) each representing a respective subset of bit values of the LTF bit pattern 1212. Thus, an overall length (P) of the LTF bit pattern 1212 may depend on a type of modulation scheme implemented by the demodulator 1270 (where P is a multiple of N). In some implementations, the demodulator 1270 may implement a QAM scheme such as, for example, 16-QAM or a higher-order modulation scheme (such as 64-QAM or 256-QAM, among other examples). Accordingly, each modulation symbol associated with the LTF sequence 1208 may be a 16-QAM, 64-QAM, or 256-QAM symbol, and the demodulator 1270 may output an LTF bit pattern 1212 of length 4N (P=4*N).

In some implementations, the demodulator 1270 may implement a QAM scheme and a PSK scheme. For example, in some aspects, the demodulator 1270 may include a QAM demodulator 1272 and a PSK demodulator 1274. The QAM demodulator 1272 may undo a modulation performed by the QAM modulator 932 of FIG. 9A to recover a first subset of bits 1209. The PSK demodulator 1274 may undo a modulation performed by the PSK modulator 934 of FIG. 9A to recover a second subset of bits 1211. The demodulator 1270 further combines the first subset of bits 1209 and the second subset of bits 1211 to produce the LTF bit pattern 1212. As described above with reference to FIG. 9A, by combining multiple modulation techniques (such as QAM and PSK) to recover the LTF bit pattern 1212, aspects of the present disclosure may further improve the security of the LTF transmissions. More specifically, the LTF bit pattern 1212 may be difficult, if not impossible, to predict by any device (other than the intended receiving device) when observing a portion of the secure LTF.

The LTF sequence comparator 1280 may compare the LTF bit pattern 1212 with a pseudorandom bit sequence (PRBS) 1214 to produce a comparison result 1216. The pseudorandom bit sequence 1214 may be generated by the pseudorandom generator 1290. In some implementations, the pseudorandom generator 1290 may be identical to the pseudorandom generator 910 of FIG. 9A. Thus, the pseudorandom bit sequence 1214 is also identical to the pseudorandom bit sequence 902. The pseudorandom generator 1290 may generate the pseudorandom bit sequence 1214 based on an output of a cipher such as, for example, an AES block cipher, a hash operation, or a stream cipher (Grain or Grain-128a). In some implementations, the pseudorandom generator 1290 may be implemented in the PHY layer of the wireless communication device and may receive a relatively small number of secure bits 1201(including a key and an initialization vector) from the MAC layer to be used to initialize the cipher block.

In some implementations, the comparison result 1216 may indicate whether the bit pattern 1212 matches a subset of the pseudorandom bit sequence 1214. For example, because the pseudorandom bit sequence 1214 is identical to the pseudorandom bit sequence 920 used by a transmitting device to generate the LTF sequence, the LTF bit pattern 1212 should match at least a subset of the pseudorandom bit sequence 1214. Thus, the comparison may be used to verify that the LTF sequence was received from the transmitting device (or a trusted source). In some other implementations, the comparison result 1216 may include a channel estimate associated with the wireless channel over which the LTF sequence is transmitted. Still further, in some implementations, the comparison result 1216 may indicate a TOA of a PPDU (such as an FTM frame or ACK) received from the transmitting device. For example, the LTF sequence comparator 1280 may record the TOA upon verifying an L' LTF sequence of the received PPDU (where the LTF field of the PPDU includes L LTF sequences).

Figure 13A:
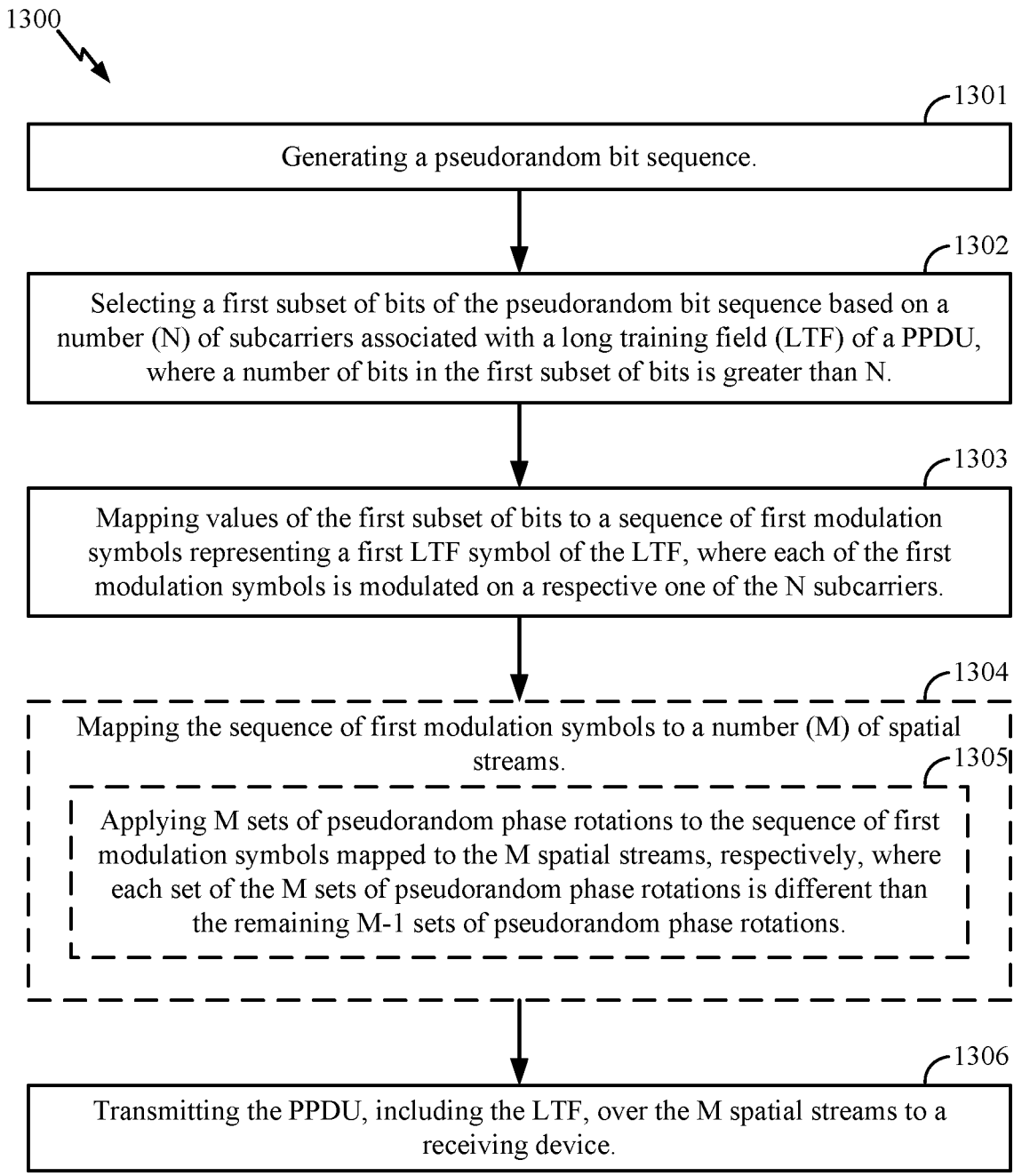
FIG. 13A shows a flowchart illustrating an example process for wireless communication that supports secure LTFs according to some implementations.

FIG. 13A shows a flowchart illustrating an example process 1300 for wireless communication that supports secure LTFs according to some implementations. In some implementations, the process 1300 may be performed by a wireless communication device operating as or within an AP such as one of the APs 102 or 602 of FIGS. 1 and 6, respectively. In some other implementations, the process 1300 may be performed by a wireless communication device operating as or within a STA such as one of the STAs 104 or 604 of FIGS. 1 and 6, respectively.

In some implementations, the process 1300 begins in block 1301 with generating a pseudorandom bit sequence. In block 1302, the process 1300 proceeds with selecting a first subset of bits of the pseudorandom bit sequence based on a number (N) of subcarriers associated with an LTF of a PPDU, where a number of bits in the first subset of bits is greater than N. In some implementations, the pseudorandom bit sequence may be generated in a PHY layer of the wireless communication device. In some implementations, the pseudorandom bit sequence may be generated based on an output of an advanced encryption standard (AES) block cipher. In some aspects, the pseudorandom bit sequence may be generated by generating a set of secure bits in a media access control (MAC) layer of the wireless communication device and initializing the block cipher in the PHY layer of the wireless communication device based on the set of secure bits from the MAC layer.

In block 1303, the process 1300 proceeds with mapping values of the first subset of bits to a sequence of first modulation symbols representing a first LTF symbol of the LTF, where each of the first modulation symbols is modulated on a respective one of the N subcarriers. In some implementations, the mapping may be performed in accordance with a QAM scheme. In some aspects, each of the first modulation symbols may be a 64-QAM symbol. In some implementations, the first subset of bits may be selected from a portion of the pseudorandom bit sequence that does not include any repetitions.

In some implementations, the process 1300 may proceed in block 1304, with mapping the sequence of first modulation symbols to a number (M) of spatial streams. In some implementations, the process 1300 may proceed in block 1305 with applying M sets of pseudorandom phase rotations to the sequence of first modulation symbols mapped to the M spatial streams, respectively, where each set of the M sets of pseudorandom phase rotations is different than the remaining M−1 sets of pseudorandom phase rotations. In some aspects, the M sets of first phase rotations may be generated based on a pseudorandom output of an LFSR. In block 1306, the process 1300 proceeds with transmitting the PPDU, including the LTF, over the M spatial streams to a receiving device.

Figure 13B:
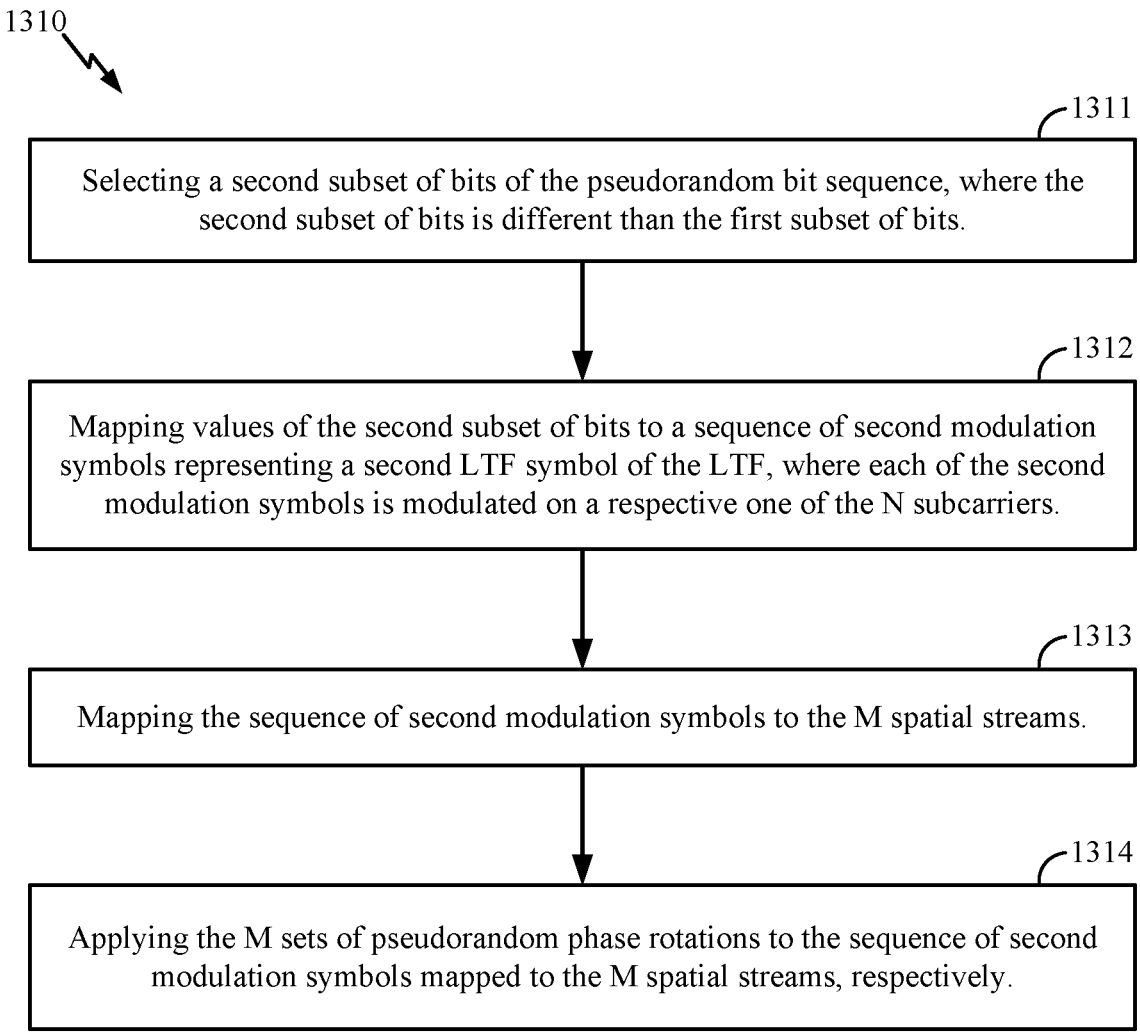
FIG. 13B shows a flowchart illustrating an example process for wireless communication that supports secure LTFs according to some implementations.

FIG. 13B shows a flowchart illustrating an example process 1310 for wireless communication that supports secure LTFs according to some implementations. In some implementations, the process 1310 may be performed by a wireless communication device operating as or within an AP such as one of the APs 102 or 602 of FIGS. 1 and 6, respectively. In some other implementations, the process 1310 may be performed by a wireless communication device operating as or within a STA such as one of the STAs 104 or 604 of FIGS. 1 and 6, respectively.

With reference for example to FIG. 13A, the process 1310 may begin, in block 1311, after the mapping of the sequence of first modulation symbols in block 1304 of the process 1300 and before the transmitting of the PPDU in block 1306. In block 1311, the process 1310 begins by selecting a second subset of bits of the pseudorandom bit sequence, where the second subset of bits is different than the first subset of bits. In block 1312, the process 1310 proceeds with mapping values of the second subset of bits to a sequence of second modulation symbols representing a second LTF symbol of the LTF, where each of the second modulation symbols is modulated on a respective one of the N subcarriers. In block 1313, the process 1310 proceeds with mapping the sequence of second modulation symbols to the M spatial streams. In block 1314, the process 1310 proceeds with applying the M sets of pseudorandom phase operations to the sequence of second modulation symbols mapped to the M spatial streams, respectively.

Figure 13C:
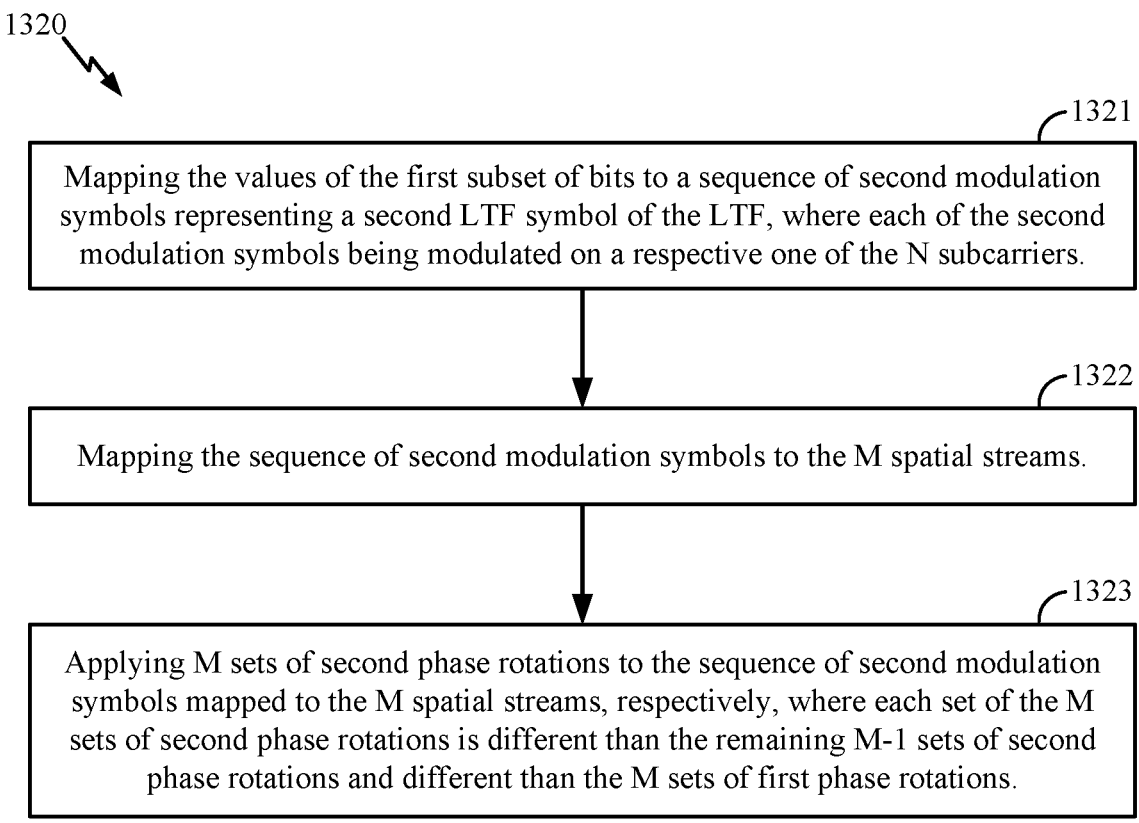
FIG. 13C shows a flowchart illustrating an example process 1320 for wireless communication that supports secure LTFs according to some implementations.

FIG. 13C shows a flowchart illustrating an example process 1320 for wireless communication that supports secure LTFs according to some implementations. In some implementations, the process 1320 may be performed by a wireless communication device operating as or within an AP such as one of the APs 102 or 602 of FIGS. 1 and 6, respectively. In some other implementations, the process 1320 may be performed by a wireless communication device operating as or within a STA such as one of the STAs 104 or 604 of FIGS. 1 and 6, respectively.

With reference for example to FIG. 13A, the process 1320 may begin, in block 1321, after the mapping of the sequence of first modulation symbols in block 1304 of the process 1300 and before the transmitting of the PPDU in block 1306. In block 1321, the process 1320 begins by mapping the values of the first subset of bits to a sequence of second modulation symbols representing a second LTF symbol of the LTF, where each of the second modulation symbols being modulated on a respective one of the N subcarriers. In block 1322, the process 1320 proceeds with mapping the sequence of second modulation symbols to the M spatial streams. In block 1323, the process 1320 proceeds with applying M sets of second phase rotations to the sequence of second modulation symbols mapped to the M spatial streams, respectively, where each set of the M sets of second phase rotations is different than the remaining M−1 sets of second phase rotations and different than the M sets of first phase rotations.

Figure 14A:
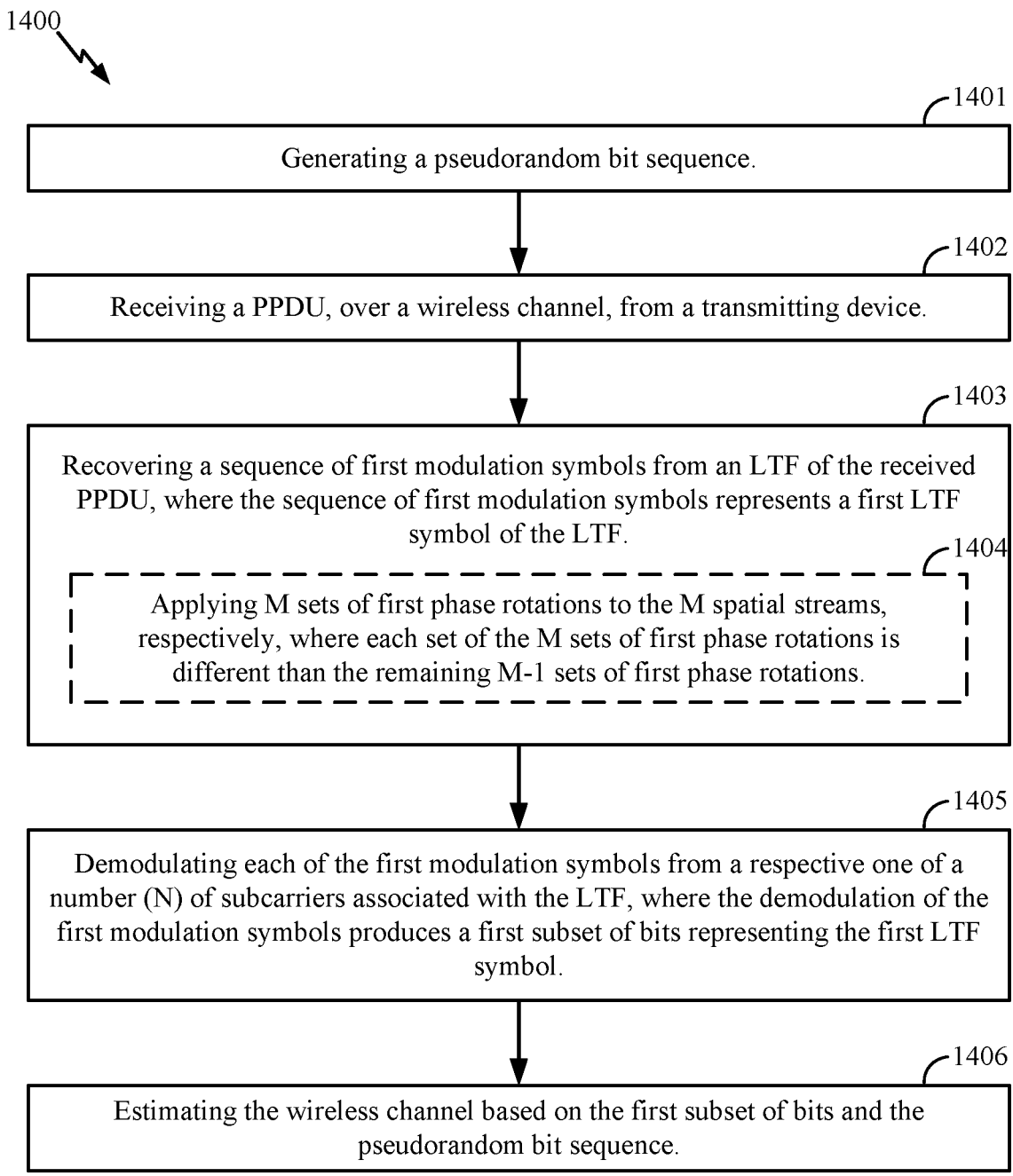
FIG. 14A shows a flowchart illustrating an example process for wireless communication that supports secure LTFs according to some implementations.

FIG. 14A shows a flowchart illustrating an example process 1400 for wireless communication that supports secure LTFs according to some implementations. In some implementations, the process 1400 may be performed by a wireless communication device operating as or within an AP such as one of the APs 102 or 602 of FIGS. 1 and 6, respectively. In some other implementations, the process 1400 may be performed by a wireless communication device operating as or within a STA such as one of the STAs 104 or 604 of FIGS. 1 and 6, respectively.

In some implementations, the process 1400 begins in block 1401 with generating a pseudorandom bit sequence. In some implementations, the pseudorandom bit sequence may be generated in a PHY layer of the wireless communication device. In some implementations, the pseudorandom bit sequence may be generated based on an output of an AES block cipher. In some aspects, the pseudorandom bit sequence may be generated by generating a set of secure bits in a MAC layer of the wireless communication device; and initializing the AES block cipher block in the PHY layer of the wireless communication device based on the set of secure bits from the MAC layer.

In block 1402, the process 1400 proceeds with receiving a PPDU, over a wireless channel, from a transmitting device. In block 1403, the process 1400 proceeds with recovering a sequence of first modulation symbols from an LTF of the received PPDU, where the sequence of first modulation symbols represents a first LTF symbol of the LTF. In some implementations, the PPDU may be received on a number (M) of spatial streams and the operation for recovering the sequence of first modulation symbols in block 1403 may include, in block 1404, applying M sets of first phase rotations to the M spatial streams, respectively, where each of the M sets of first phase rotations is different than the remaining M−1 sets of first phase rotations. In some aspects, the M sets of first phase rotations may be generated based on a pseudorandom output of an LFSR.

In block 1405, the process 1400 proceeds with demodulating each of the first modulation symbols from a respective one of a number (N) of subcarriers associated with the LTF, where the demodulation of the first modulation symbols produces a first subset of bits representing the first LTF symbol. In some implementations, each of the first modulation symbols may be demodulated in accordance with a QAM scheme. In some aspects, each of the first modulation symbols may be a 64-QAM symbol. In block 1406, the process 1400 proceeds with estimating the wireless channel based on the first subset of bits and the pseudorandom bit sequence.

Figure 14B:
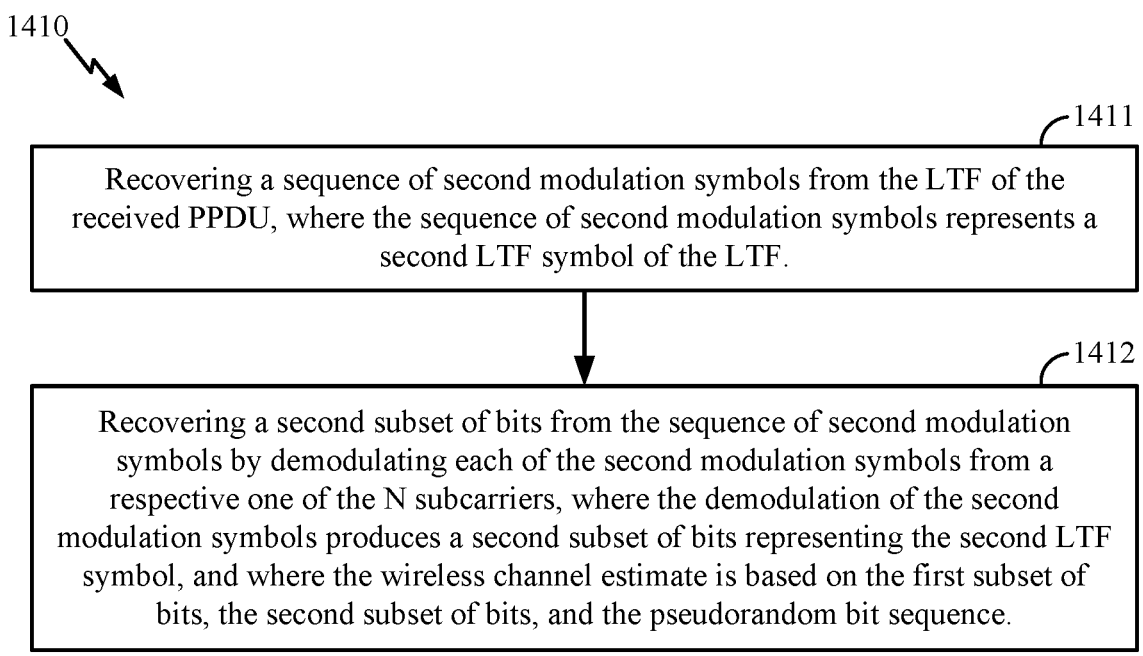
FIG. 14B shows a flowchart illustrating an example process for wireless communication that supports secure LTFs according to some implementations.

FIG. 14B shows a flowchart illustrating an example process 1410 for wireless communication that supports secure LTFs according to some implementations. In some implementations, the process 1410 may be performed by a wireless communication device operating as or within an AP such as one of the APs 102 or 602 of FIGS. 1 and 6, respectively. In some other implementations, the process 1410 may be performed by a wireless communication device operating as or within a STA such as one of the STAs 104 or 604 of FIGS. 1 and 6, respectively.

With reference for example to FIG. 14A, the process 1410 may begin, in block 1411, after the demodulating of the first modulation symbols in block 1405 of the process 1400 and before the estimating of the wireless channel in block 1406. In block 1411, the process 1410 begins by recovering a sequence of second modulation symbols from the LTF of the received PPDU, where the sequence of second modulation symbols represents a second LTF symbol of the LTF. In block 1412, the process 1410 proceeds with demodulating each of the second modulation symbols from a respective one of the N subcarriers, where the demodulation of the second modulation symbols produces a second subset of bits representing the second LTF symbol, and where the wireless channel estimate being based on the first subset of bits, the second subset of bits, and the pseudorandom bit sequence.

In some implementations, the sequence of second modulation symbols may be recovered by applying the M sets of first phase rotations to the M spatial streams, respectively. In some other implementations, the sequence of second modulation symbols may be recovered by applying M sets of first phase rotations to the M spatial streams, respectively, where each set of the M sets of first phase rotations is different than the remaining M−1 sets of first phase rotations.

Figure 15:
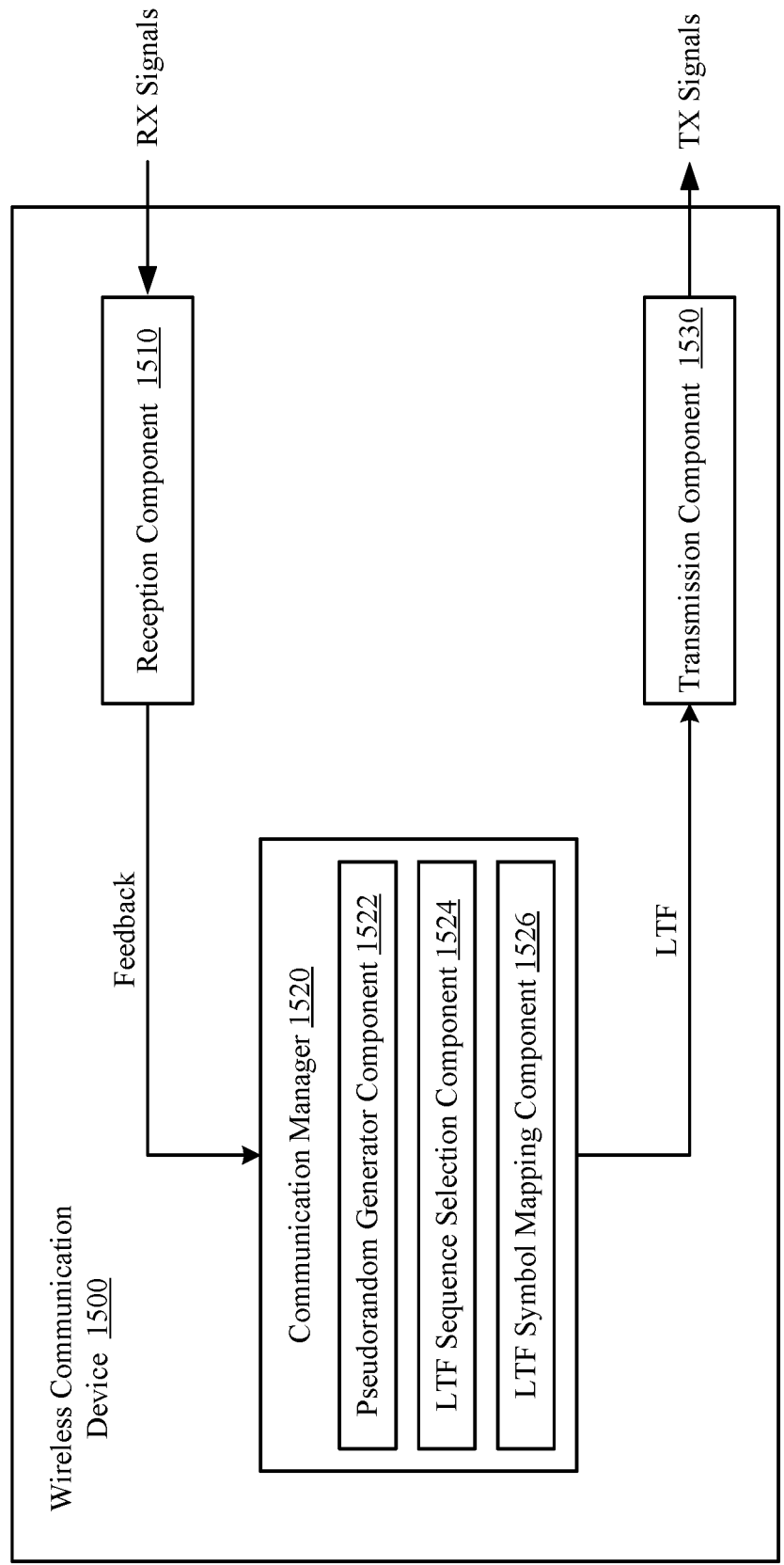
FIG. 15 shows a block diagram of an example wireless communication device according to some implementations.

FIG. 15 shows a block diagram of an example wireless communication device 1500 according to some implementations. In some implementations, the wireless communication device 1500 is configured to perform any of the processes 1300 or 1310 described above with reference to FIGS. 13A and 13B, respectively. In some implementations, the wireless communication device 1500 can be an example implementation of the wireless communication device 500 described above with reference to FIG. 5. For example, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The transmission component may further include a pseudorandom generator component 1522, an LTF sequence selection component 1524, an LTF symbol mapping component 1526. Portions of one or more of the components 1522-1526 may be implemented at least in part in hardware or firmware. In some implementations, at least some of the components 1522, 1524, or 1526 are implemented at least in part as software stored in a memory (such as the memory 508). For example, portions of one or more of the components 1522, 1524, and 1526 can be implemented as non-transitory instructions (or "code") executable by a processor (such as the processor 506) to perform the functions or operations of the respective component.

The reception component 1510 is configured to receive RX signals from another wireless communication device. In some implementations, the RX signals may include feedback responsive to one or more PPDUs transmitted by the wireless communication device 1500. The communication manager 1520 is configured to generate secure LTFs to be transmitted with the PPDUs. In some implementations, the pseudorandom generator component 1522 may generate a pseudorandom bit sequence; the LTF sequence selection component 1524 may select a subset of bits of the pseudorandom bit sequence based on a number (N) of subcarriers associated with an LTF of a PPDU, where the number of bits in the subset of bits is greater than N; and the LTF symbol mapping component 1526 may map values of the subset of bits to a sequence of modulation symbols representing a LTF symbol of the LTF, where each of the modulation symbols is modulated on a respective one of the N subcarriers. The transmission component 1530 is configured to transmit the PPDU, including the LTF to a receiving device. For example, the PPDU may be transmitted as TX signals to the other wireless communication device.

Figure 16:
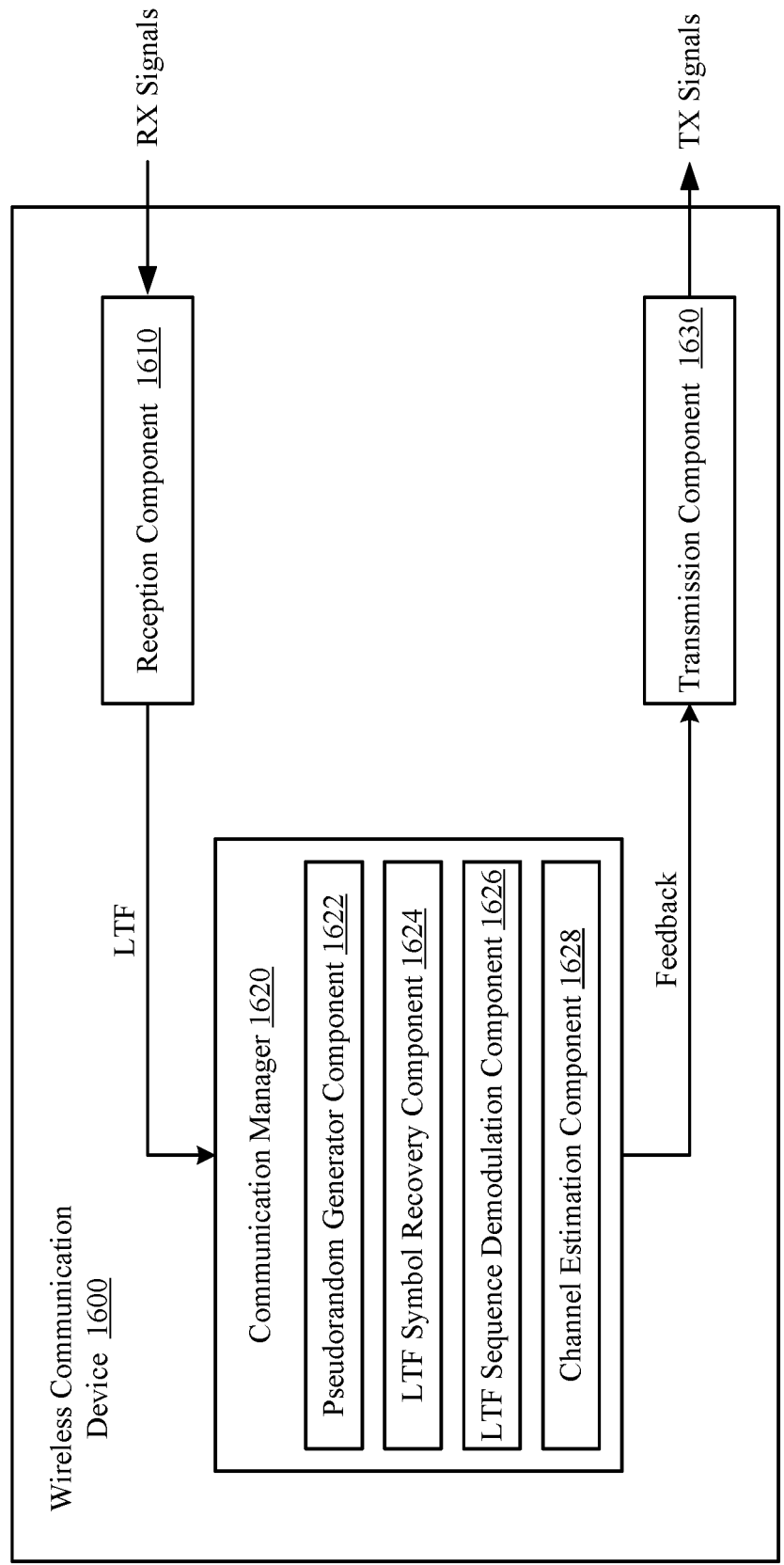
FIG. 16 shows a block diagram of an example wireless communication device according to some implementations.

FIG. 16 shows a block diagram of an example wireless communication device 1600 according to some implementations. In some implementations, the wireless communication device 1600 is configured to perform any of the processes 1400 or 1410 described above with reference to FIGS. 14A and 14B, respectively. In some implementations, the wireless communication device 1600 can be an example implementation of the wireless communication device 500 described above with reference to FIG. 5. For example, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The transmission component may further include a pseudorandom generator component 1622, an LTF symbol recovery component 1624, an LTF sequence demodulation component 1626, and a channel estimation component 1628. Portions of one or more of the components 1622-1628 may be implemented at least in part in hardware or firmware. In some implementations, at least some of the components 1622, 1624, 1626, or 1628 are implemented at least in part as software stored in a memory (such as the memory 508). For example, portions of one or more of the components 1622, 1624, 1626, and 1628 can be implemented as non-transitory instructions or code executable by a processor (such as the processor 506) to perform the functions or operations of the respective component.

The reception component 1610 is configured to receive RX signals from another wireless communication device. In some implementations, the RX signals may include a PPDU received over a wireless channel. The communication manager 1620 is configured to detect and verify secure LTFs in the received PPDUs. In some implementations, the pseudorandom generator component 1622 may generate a pseudorandom bit sequence; the LTF symbol recovery component 1624 may recover a sequence of modulation symbols from an LTF of the received PPDU, where the sequence of modulation symbols represents a LTF symbol of an LTF of the PPDU; and the LTF sequence demodulation component 1626 may demodulate each of the modulation symbols from a respective one of a number (N) of subcarriers associated with the LTF, where the demodulation of the first modulation symbols produces a first subset of bits representing the first LTF symbol; and the channel estimation component 1628 may estimate the wireless channel based on the first subset of bits and the pseudorandom bit sequence. The transmission component 1630 is configured to TX signals to the other wireless communication device. In some implementations, the TX signals may include feedback based at least in part on the comparison performed by the bit pattern comparison component 1628.

Implementation examples are described in the following numbered clauses:

1. A method for wireless communication by a wireless communication device, including:
generating a pseudorandom bit sequence;
selecting a first subset of bits of the pseudorandom bit sequence based on a number (N) of subcarriers associated with a long training field (LTF) of a physical (PHY) layer convergence protocol (PLCP) protocol data unit (PPDU), a number of bits in the first subset of bits being greater than N;
mapping values of the first subset of bits to a sequence of first modulation symbols representing a first LTF symbol of the LTF, each of the first modulation symbols being modulated on a respective one of the N subcarriers; and
transmitting the PPDU, including the LTF, to a receiving device.

2. The method of clause 1, where the pseudorandom bit sequence is generated in a PHY layer of the wireless communication device.

3. The method of any of clauses 1 or 2, where the pseudorandom bit sequence is generated based on an output of an advanced encryption standard (AES) block cipher.

4. The method of any of clauses 1-3, where the generating of the pseudorandom bit sequence includes:
generating a set of secure bits in a media access control (MAC) layer of the wireless communication device; and
initializing the block cipher in the PHY layer of the wireless communication device based on the set of secure bits from the MAC layer.

5. The method of any of clauses 1-4, where the mapping of the values of the first subset of bits to the sequence of first modulation symbols is performed in accordance with a quadrature amplitude modulation (QAM) scheme.

6. The method of any of clauses 1-5, where each of the first modulation symbols is a 64-QAM symbol.

7. The method of any of clauses 1-6, where the first subset of bits is selected from a portion of the pseudorandom bit sequence that does not include any repetitions.

8. The method of any of clauses 1-7, further including:
mapping the sequence of first modulation symbols to a number (M) of spatial streams; and
applying M sets of first phase rotations to the sequence of first modulation symbols mapped to the M spatial streams, respectively, each set of the M sets of first phase rotations being different than the remaining M−1 sets of first phase rotations.

9. The method of any of clauses 1-8, further including:
generating the M sets of first phase rotations based on a pseudorandom output of a linear feedback shift register (LFSR).

10. The method of any of clauses 1-9, further including:
selecting a second subset of bits of the pseudorandom bit sequence, the second subset of bits being different than the first subset of bits;
mapping values of the second subset of bits to a sequence of second modulation symbols representing a second LTF symbol of the LTF, each of the second modulation symbols being modulated on a respective one of the N subcarriers;
mapping the sequence of second modulation symbols to the M spatial streams; and
applying the M sets of first phase rotations to the sequence of second modulation symbols mapped to the M spatial streams, respectively.

11. The method of any of clauses 1-10, where the second subset of bits is selected from a portion of the pseudorandom bit sequence that does not include any repetitions or bits from the first subset.

12. The method of any of clauses 1-9, further including:
mapping the values of the first subset of bits to a sequence of second modulation symbols representing a second LTF symbol of the LTF, each of the second modulation symbols being modulated on a respective one of the N subcarriers;
mapping the sequence of second modulation symbols to the M spatial streams; and
applying M sets of second phase rotations to the sequence of second modulation symbols mapped to the M spatial streams, respectively, each set of the M sets of second phase rotations being different than the remaining M−1 sets of second phase rotations and different than the M sets of first phase rotations.

13. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-12.

14. A method for wireless communication by a wireless communication device, the method including:
generating a pseudorandom bit sequence;
receiving a physical (PHY) layer convergence protocol (PLCP) protocol data unit (PPDU), over a wireless channel, from a transmitting device;
recovering a sequence of first modulation symbols from a long training field (LTF) of the received PPDU, the sequence of first modulation symbols representing a first LTF symbol of the LTF;
demodulating each of the first modulation symbols from a respective one of a number (N) of subcarriers associated with the LTF, the demodulation of the first modulation symbols producing a first subset of bits representing the first LTF symbol; and
estimating the wireless channel based on the first subset of bits and the pseudorandom bit sequence.

15. The method of clause 14, where the pseudorandom bit sequence is generated in a PHY layer of the wireless communication device.

16. The method of any of clauses 14 or 15, where the pseudorandom bit sequence is generated based on an output of an advanced encryption standard (AES) block cipher.

17. The method of any of clauses 14-16, where the generating of the pseudorandom bit sequence includes:
generating a set of secure bits in a media access control (MAC) layer of the wireless communication device; and
initializing the AES block cipher block in the PHY layer of the wireless communication device based on the set of secure bits from the MAC layer.

18. The method of any of clauses 14-17, where each of the first modulation symbols is demodulated in accordance with a quadrature amplitude modulation (QAM) scheme.

19. The method of any of clauses 14-18, where each of the first modulation symbols is a 64-QAM symbol.

20. The method of any of clauses 14-19, where the PPDU is received on a number (M) of spatial streams, the recovering of the sequence of first modulation symbols including:
applying M sets of first phase rotations to the M spatial streams, respectively, each set of the M sets of first phase rotations being different than the remaining M−1 sets of first phase rotations.

21. The method of any of clauses 14-20, further including:
generating the M sets of first phase rotations based on a pseudorandom output of a linear feedback shift register (LFSR).

22. The method of any of clauses 14-21, further including:
recovering a sequence of second modulation symbols from the LTF of the received PPDU, the sequence of second modulation symbols representing a second LTF symbol of the LTF; and
demodulating each of the second modulation symbols from a respective one of the N subcarriers, the demodulation of the second modulation symbols producing a second subset of bits representing the second LTF symbol, the wireless channel estimate being based on the first subset of bits, the second subset of bits, and the pseudorandom bit sequence.

23. The method of any of clauses 14-22, where the recovering of the sequence of second modulation symbols includes:
applying the M sets of first phase rotations to the M spatial streams, respectively.

24. The method of any of clauses 14-22, where the recovering of the sequence of second modulation symbols includes:
applying the M sets of second phase rotations to the M spatial streams, respectively, each of the M sets of second phase rotations being different than the remaining M−1 sets of second phase rotations and different than the M sets of first phase rotations.

25. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 14-24.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, the method comprising:
   selecting a subset of bits of a pseudorandom bit sequence based on a number of subcarriers associated with a long training field (LTF) of a physical (PHY) layer convergence protocol (PLCP) protocol data unit (PPDU), a number of bits in the subset of bits being based on the number of subcarriers and a type of modulation scheme;
   mapping values of the subset of bits to first modulation symbols representing a first LTF symbol of the LTF in accordance with the type of modulation scheme, each of the first modulation symbols being modulated on a respective one of the number of subcarriers, and each of the first modulation symbols being represented by a respective subset of values of the subset of bits; and
   transmitting the PPDU including the LTF.

2. The method of claim 1, wherein the pseudorandom bit sequence is generated in a physical (PHY) layer of the wireless communication device.

3. The method of claim 1, wherein the pseudorandom bit sequence is generated based on an output of an advanced encryption standard (AES) block cipher.

4. The method of claim 3, wherein generating the pseudorandom bit sequence comprises:
   generating a set of secure bits in a media access control (MAC) layer of the wireless communication device; and
   initializing the AES block cipher in a physical (PHY) layer of the wireless communication device based on the set of secure bits from the MAC layer.

5. The method of claim 1, wherein mapping the values of the subset of bits to the first modulation symbols is performed in accordance with a quadrature amplitude modulation (QAM) scheme.

6. The method of claim 5, wherein each of the first modulation symbols is a 64-QAM symbol.

7. The method of claim 1, wherein the subset of bits is selected from a portion of the pseudorandom bit sequence that does not include any repetitions.

8. The method of claim 1, further comprising:
   applying a spatial mapping matrix to the first modulation symbols to map the first modulation symbols on a number of spatial streams; and
   applying first pseudorandom phase rotations to the number of spatial streams, wherein each of the first pseudorandom phase rotations is different than a remainder of the first pseudorandom phase rotations, and wherein a different pseudorandom phase rotation, from the first pseudorandom phase rotations, is applied to each of the number of spatial streams.

9. The method of claim 8, further comprising:
   generating the first pseudorandom phase rotations based on a pseudorandom output of a pseudorandom function.

10. The method of claim 8, further comprising:
    selecting a second subset of bits of the pseudorandom bit sequence, the second subset of bits being different than the subset of bits;
    mapping values of the second subset of bits to second modulation symbols representing a second LTF symbol of the LTF, each of the second modulation symbols being modulated on a respective one of the number of subcarriers, and each of the second modulation symbols being represented by a respective subset of values of the second subset of bits;
    applying the spatial mapping matrix to the second modulation symbols to map the second modulation symbols on the number of spatial streams; and
    applying the first pseudorandom phase rotations to the number of spatial streams, respectively.

11. The method of claim 10, wherein the second subset of bits is selected from a portion of the pseudorandom bit sequence that does not include any repetitions or bits from the subset of bits.

12. The method of claim 8, further comprising:
    mapping the values of the subset of bits to second modulation symbols representing a second LTF symbol of the LTF, each of the second modulation symbols being modulated on a respective one of the number of subcarriers, and each of the second modulation symbols being represented by a respective subset of values of the subset of bits;
    applying the spatial mapping matrix to the second modulation symbols to map the second modulation symbols on the number of spatial streams; and
    applying second pseudorandom phase rotations to the number of spatial streams, respectively, each set of the second pseudorandom phase rotations being different than a remainder of the second pseudorandom phase rotations and different than the first pseudorandom phase rotations.

13. A wireless communication device comprising:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to:
        select a subset of bits of a pseudorandom bit sequence based on a number of subcarriers associated with a long training field (LTF) of a physical (PHY) layer convergence protocol (PLCP) protocol data unit (PPDU), a number of bits in the subset of bits being based on the number of subcarriers and a type of modulation scheme;

map values of the subset of bits to first modulation symbols representing a first LTF symbol of the LTF in accordance with the type of modulation scheme, each of the first modulation symbols being modulated on a respective one of the number of subcarriers, and each of the first modulation symbols being represented by a respective subset of values of the subset of bits; and transmit the PPDU including the LTF.

14. The wireless communication device of claim 13, wherein mapping the values of the subset of bits to the first modulation symbols is performed in accordance with a quadrature amplitude modulation (QAM) scheme, each of the first modulation symbols being a 64-QAM symbol.

15. The wireless communication device of claim 13, wherein execution of the processor-readable code is further configured to:

apply a spatial mapping matrix to the first modulation symbols to map the first modulation symbols on a number of spatial streams; and apply first pseudorandom phase rotations to the number of spatial streams, wherein each of the first pseudorandom phase rotations is different than a remainder of the first pseudorandom phase rotations, and wherein a different pseudorandom phase rotation, from the first pseudorandom phase rotations, is applied to each of the number of spatial streams.

16. The wireless communication device of claim 15, wherein execution of the processor-readable code is further configured to:

select a second subset of bits of the pseudorandom bit sequence, the second subset of bits being different than the subset of bits;

map values of the second subset of bits to second modulation symbols representing a second LTF symbol of the LTF, each of the second modulation symbols being modulated on a respective one of the number of subcarriers, and each of the second modulation symbols being represented by a respective subset of values of the second subset of bits;

apply the spatial mapping matrix to the second modulation symbols to map the second modulation symbols on the number of spatial streams; and apply the first pseudorandom phase rotations to the number of spatial streams, respectively.

17. The wireless communication device of claim 15, wherein execution of the processor-readable code is further configured to:

map the values of the subset of bits to second modulation symbols representing a second LTF symbol of the LTF, each of the second modulation symbols being modulated on a respective one of the number of subcarriers and each of the second modulation symbols being represented by a respective subset of values of the subset of bits;

apply the spatial mapping matrix to the second modulation symbols to map the second modulation symbols on the number of spatial streams; and apply second pseudorandom phase rotations to the number of spatial streams, respectively, each of the second pseudorandom phase rotations being different than a remainder of the second pseudorandom phase rotations and different than the first pseudorandom phase rotations.

18. A method for wireless communication by a wireless communication device, the method comprising:

receiving, over a wireless channel, a physical (PHY) layer convergence protocol (PLCP) protocol data unit (PPDU);

recovering first modulation symbols from a long training field (LTF) of the PPDU, the first modulation symbols representing a first LTF symbol of the LTF;

demodulating each of the first modulation symbols from a respective one of a number of subcarriers associated with the LTF, demodulation of the first modulation symbols producing a subset of bits representing the first LTF symbol, a number of bits in the subset of bits being based on the number of subcarriers and a type of modulation scheme, and each of the first modulation symbols being represented by a respective subset of values of the subset of bits; and estimating the wireless channel based on whether the subset of bits matches a portion of a pseudorandom bit sequence.

19. The method of claim 18, wherein the pseudorandom bit sequence is generated in a physical (PHY) layer of the wireless communication device.

20. The method of claim 18, wherein the pseudorandom bit sequence is generated based on an output of an advanced encryption standard (AES) block cipher.

21. The method of claim 20, wherein generating the pseudorandom bit sequence comprises:

generating a set of secure bits in a media access control (MAC) layer of the wireless communication device; and initializing the AES block cipher block in a physical (PHY) layer of the wireless communication device based on the set of secure bits from the MAC layer.

22. The method of claim 18, wherein each of the first modulation symbols is demodulated in accordance with a quadrature amplitude modulation (QAM) scheme.

23. The method of claim 22, wherein each of the first modulation symbols is a 64-QAM symbol.

24. The method of claim 18, wherein the PPDU is received on a number of spatial streams, the method further comprising:

applying first pseudorandom phase rotations to the number of spatial streams, wherein each of the first pseudorandom phase rotations is different than a remainder of the first pseudorandom phase rotations, and wherein a different pseudorandom phase rotation, from the first pseudorandom phase rotations, is applied to each of the number of spatial streams.

25. The method of claim 24, further comprising:

generating the first pseudorandom phase rotations based on a pseudorandom output of a pseudorandom function.

26. The method of claim 24, further comprising:

recovering second modulation symbols from the LTF of the PPDU, the second modulation symbols representing a second LTF symbol of the LTF; and demodulating each of the second modulation symbols from a respective one of the number of subcarriers, demodulation of the second modulation symbols producing a second subset of bits representing the second LTF symbol, each of the second modulation symbols being represented by a respective subset of values of the second subset of bits, and estimating the wireless channel being based on the subset of bits, the second subset of bits, and the pseudorandom bit sequence.

27. The method of claim 26, wherein recovering the second modulation symbols comprises:
applying the first pseudorandom phase rotations to the number of spatial streams, respectively.

28. The method of claim 26, wherein recovering the second modulation symbols comprises:
applying second pseudorandom phase rotations to the number of spatial streams, respectively, each of the second pseudorandom phase rotations being different than a remainder of the second pseudorandom phase rotations and different than the first pseudorandom phase rotations.

29. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive, over a wireless channel, a physical (PHY) layer convergence protocol (PLCP) protocol data unit (PPDU);
recover first modulation symbols from a long training field (LTF) of the PPDU, the first modulation symbols representing a first LTF symbol of the LTF;
demodulate each of the first modulation symbols from a respective one of a number of subcarriers associated with the LTF, demodulation of the first modulation symbols producing a subset of bits representing the first LTF symbol, a number of bits in the subset of bits being based on the number of subcarriers and a type of modulation scheme, and each of the first modulation symbols being represented by a respective subset of values of the subset of bits; and
estimate the wireless channel based on whether the subset of bits matches a portion of a pseudorandom bit sequence.

30. The wireless communication device of claim 29, wherein each of the first modulation symbols is demodulated in accordance with a quadrature amplitude modulation (QAM) scheme, each of the first modulation symbols being a 64-QAM symbol.

31. The wireless communication device of claim 29, wherein the PPDU is received on a number of spatial streams, and wherein execution of the processor-readable code is further configured to:
apply first pseudorandom phase rotations to the number of spatial streams, wherein each of the first pseudorandom phase rotations is different than a remainder of the first pseudorandom phase rotations, and wherein a different pseudorandom phase rotation, from the first pseudorandom phase rotations, is applied to each of the number of spatial streams.

32. The wireless communication device of claim 31, wherein execution of the processor-readable code is further configured to:
recover second modulation symbols from the LTF of the PPDU, the second modulation symbols representing a second LTF symbol of the LTF; and
demodulate each of the second modulation symbols from a respective one of the number of subcarriers, demodulation of the second modulation symbols producing a second subset of bits representing the second LTF symbol, each of the second modulation symbols being represented by a respective subset of values of the second subset of bits, and estimating the wireless channel being based on the subset of bits, the second subset of bits, and the pseudorandom bit sequence.

33. The wireless communication device of claim 32, wherein recovering the second modulation symbols comprises:
applying the first pseudorandom phase rotations to the number of spatial streams, respectively.

34. The wireless communication device of claim 32, wherein recovering the second modulation symbols comprises:
applying second pseudorandom phase rotations to the number of spatial streams, respectively, each of the second pseudorandom phase rotations being different than a remainder of the second pseudorandom phase rotations and different than the first pseudorandom phase rotations.

* * * * *